United States Patent
Yun et al.

(10) Patent No.: US 9,285,903 B1
(45) Date of Patent: Mar. 15, 2016

(54) STYLUS AND ELECTRONIC DISPLAY

(75) Inventors: Tiffany Yun, Fremont, CA (US); Julien G. Beguin, San Francisco, CA (US); Susan Jie Gao, Santa Clara, CA (US); Tomer Moscovich, San Francisco, CA (US); Bradley J. Bozarth, Sunnyvale, CA (US); Ilya D. Rosenberg, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 841 days.

(21) Appl. No.: 13/247,726

(22) Filed: Sep. 28, 2011

(51) Int. Cl.
  *G06F 3/045* (2006.01)
  *G06F 3/041* (2006.01)
  *G06F 3/046* (2006.01)

(52) U.S. Cl.
  CPC ............ *G06F 3/041* (2013.01); *G06F 3/046* (2013.01)

(58) Field of Classification Search
  CPC .............. G06F 3/03545; G06F 2203/04101; G06F 2203/04106; G06F 2203/046; G06F 2200/1632
  USPC .......................................... 345/173–174, 179
  See application file for complete search history.

(56) References Cited

U.S. PATENT DOCUMENTS

| | | | |
|---|---|---|---|
| 2003/0095115 A1* | 5/2003 | Brian et al. | 345/179 |
| 2005/0093868 A1* | 5/2005 | Hinckley | 345/502 |
| 2009/0135164 A1* | 5/2009 | Kyung | G06F 3/03545 345/173 |
| 2009/0256817 A1* | 10/2009 | Perlin et al. | 345/174 |
| 2010/0267421 A1* | 10/2010 | Rofougaran | 455/566 |
| 2011/0050593 A1* | 3/2011 | Kim et al. | 345/173 |
| 2011/0164000 A1* | 7/2011 | Pance | G06F 3/03545 345/179 |
| 2012/0068964 A1* | 3/2012 | Wright et al. | 345/174 |
| 2012/0306766 A1* | 12/2012 | Moore | 345/173 |
| 2012/0306811 A1* | 12/2012 | Farmer et al. | 345/174 |

OTHER PUBLICATIONS

Ashbrook, et al., "Nenya: Subtle and Eyes-Free Mobile Input with a Magnetically-Tracked Finger Ring", CHI 2011, May 7-12, 2011, 4 pages.

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Columbia, Canada, Oct. 4-7, 2009). UIST '09. ACM, New York, NY, 4 pages.

\* cited by examiner

*Primary Examiner* — Temesgh Ghebretinsae
*Assistant Examiner* — Kwin Xie
(74) *Attorney, Agent, or Firm* — Lee & Hayes, PLLC; Shivshanker S. Naimpally

(57) ABSTRACT

A device comprising a magnetic stylus, touch sensor, and reflective display provides new opportunities for content presentation and interaction. A user interface is configured to use input from the stylus and touch sensor to modify content presented on the reflective display.

30 Claims, 22 Drawing Sheets

STYLUS AND ELECTRONIC DISPLAY

RELATED APPLICATION

The present application is related to U.S. application Ser. No. 12/846,539, filed on Jul. 29, 2010, entitled "Magnetic Touch Discrimination." This pending application is hereby incorporated by reference in its entirety. This application also hereby incorporates by reference in its entirety U.S. application Ser. No. 13/247,412, filed on Sep. 28, 2011, entitled "Magnetic Stylus."

BACKGROUND

Electronic devices that accept input from users are ubiquitous, and include cellular phones, eBook readers, tablet computers, desktop computers, portable media devices, and so forth. Increasingly, users desire these devices to accept input without the use of traditional keyboards or mice.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicate similar or identical items.

DETAILED DESCRIPTION

Overview

Figure 1:
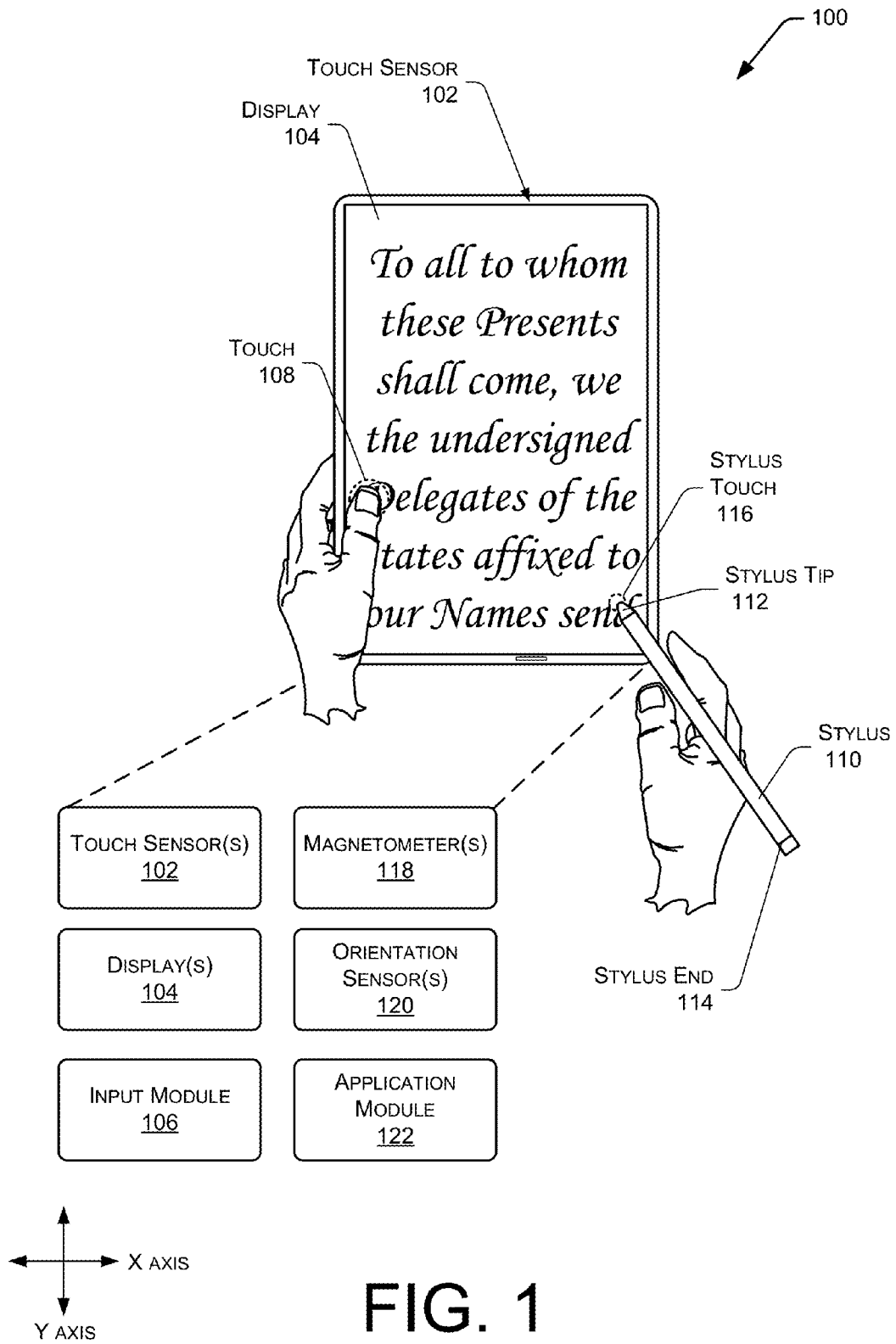
FIG. 1 depicts an electronic device configured to accept input from devices including a touch sensor and a magnetometer.

Described herein are devices and techniques for accepting input in an electronic device. These devices include a stylus containing a magnet, magnetic field sensors configured to track the stylus, and one or more touch sensors configured to detect touches made by the stylus and by other instruments. By generating information from the magnetic field sensors about the position, orientation, tilt, rotation, and so forth of the magnetic stylus relative to the device, the described devices and techniques enable rich input modes alone or in combination with one another. Information may be presented to a user by a display device, such as a reflective electrophoretic display, liquid crystal display (LCD), light emitting diode (LED) display, or the like.

A plurality of devices may be coupled to one another to enable multiuser applications. These multiuser applications may be configured to accept handwritten inputs or stylus gestures on one device and present at least a portion thereof or a response thereto on another device.

Different classes of static content including, but not limited to, pencil-and-paper games are available. This static content is such that presentation combined with some ability to annotate the static content is sufficient to make use of the content. Static content includes, but is not limited to forms, crossword puzzles, Sudoku games, word searches, and so forth. This content may be processed by an intake system and presented for use on the electronic device using, at least in part, input from the stylus. Processing may include re-rendering to provide for improved presentation on the display, adding dynamic elements to the static content, and so forth.

The device comprising the touch sensor, magnetic stylus, and display provides a platform suitable for writing training, signature recognition, and so forth. Users may practice the writing of various letters, symbols, shapes, and so forth using the device. By monitoring the motion and orientation of the stylus in conjunction with information from the touch sensor, the user may practice manipulation of the stylus and receive detailed feedback. Also, the various vector information acquired from the stylus motion and the touch sensor may be used to authenticate a user's signature by looking for biophysical differences in the manipulation of the stylus.

The "page" or presentation on the display presented for user input may be reconfigured via gestural input. A user may sketch a rough grid on the touch sensor with a stylus to have the page formatted with a grid in a fashion analogous to graph paper. The formatting of the page may also be used to select input tools. For example, while the page formatting is a grid, the tool selection may be configured such that the stylus input is presented as a simulated mechanical pencil with horizontal/ vertical line snapping to emulate drawing a line with a ruler. In contrast, when the page formatting is a set of horizontal lines spaced for writing such as on notebook paper, the tool selection may be configured such that the stylus input is presented as a simulated pen and no snapping for freeform input.

Handwritten text input via the stylus on the touch sensor may also be used to initiate pre-determined functions. For example, writing "www" on the display may initiate a web browser interface. Such handwriting shortcuts allow for rapid and convenient navigation.

Other functions may be called by other user input gestures in the user interface. For example, circling a word may initiate a find command, seeking out and indicating other occurrences of the word as presented in the user interface.

Functions available in a user interface may be via one or more instructional user prompts on the display. These instructional user prompts provide specific gestural directives which, when executed by the user, initiate the function. For example, a user prompt may say "cross out this box to clear page." Upon a user using the stylus to draw one or more lines through the box, the display is cleared.

Content on the display may be presented in one or more virtual layers. Gestures or other commands may act on an individual layer, a subset of layers, or on all layers simultaneously. For example, a user may annotate an electronic book by handwriting comments. The user may later come along and erase a word from those comments, leaving the original text of the electronic book unaffected.

Users may also initiate functions using a topologically unambiguous path between two or more elements of the user interface. For example, a set of different controls may be presented on the display. The user may draw a line with the stylus on the touchscreen connecting a plurality of these controls. By "connecting the dots" between the particular controls, the user is thus able to initiate a particular function or set of functions. The topology or sequence of connection may also be used to designate the order in which those commands are initiated.

Illustrative Device

FIG. 1 depicts an electronic device 100 configured with a touch sensor, magnetometer, and other sensors. A touch sensor 102 accepts input resulting from contact and/or application of incident force, such as a user finger or stylus pressing upon the touch sensor. While the touch sensor 102 is depicted on the front of the device, it is understood that other touch sensors 102 may be disposed along the other sides of the device instead of, or in addition to, the touch sensor on the front. A display 104 is configured to present information to the user. In some implementations, the display 104 and the touch sensor 102 may be combined to provide a touch-sensitive display, or touchscreen display.

Within or coupled to the device, an input module 106 accepts input from the touch sensor 102 and other sensors. For example, as depicted here with a broken line is a user touch 108 on the touch sensor 102. Also depicted is a stylus 110 having two opposing terminal structures, a stylus tip 112 and a stylus end 114. The stylus tip 112 is shown in contact with the touch sensor 102 as indicated by the stylus touch 116. In some implementations, the stylus tip 112 may be configured to be non-marking such that operates free from depositing a visible trace of material such as graphite, ink, or other material.

Returning to the sensors within the device 100, one or more magnetometers 118 are accessible to the input module 106. These magnetometers are configured to detect, and in some implementations characterize, impinging magnetic fields. As used herein, the term "magnetometer" includes devices configured to detect and characterize one or more impinging magnetic fields. One or more orientation sensors 120 such as accelerometers, gravimeters, and so forth may also be present. These sensors are discussed in more detail in FIG. 2.

The device 100 may also include an application module 122. The application module 122 is configured to interact with other elements such as the input module 106 to provide functions such as the user interface.

Figure 2:
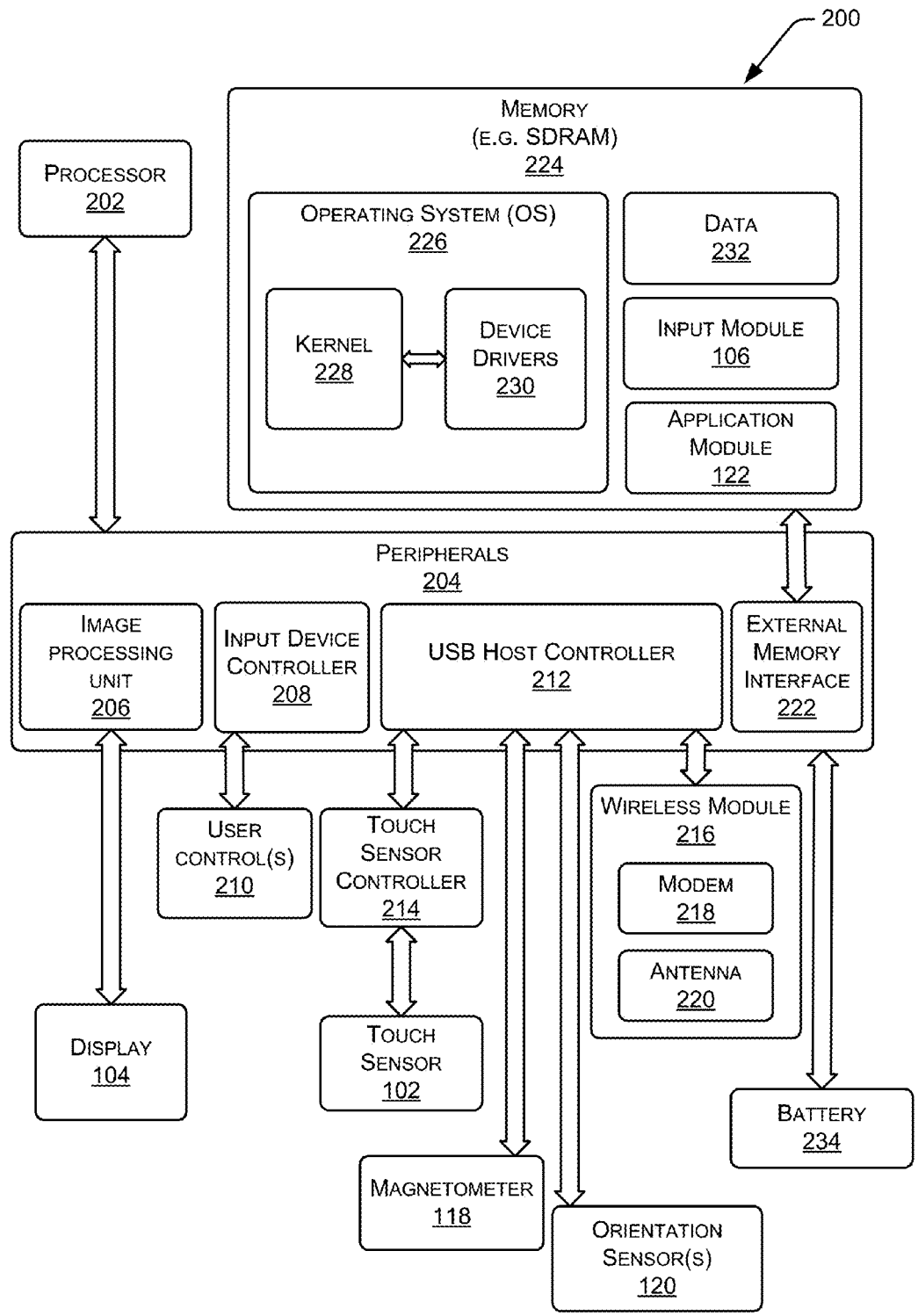
FIG. 2 is an illustrative schematic of the electronic device with an input module configured to use the touch sensor, the magnetometer, or both to accept user input.

FIG. 2 is an illustrative schematic 200 of the electronic device 100 of FIG. 1. In a very basic configuration, the device 100 includes components such as a processor 202 and one or more peripherals 204 coupled to the processor 202. Each processor 202 may itself comprise one or more processors.

An image processing unit 206 is shown coupled to one or more display components 104 (or "displays"). In some implementations, multiple displays may be present and coupled to the image processing unit 206. These multiple displays may be located in the same or different enclosures or panels. Furthermore, one or more image processing units 206 may couple to the multiple displays.

The display 104 may present content in a human-readable format to a user. The display 104 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display. The display 104 may be color or monochrome.

For convenience only, the display 104 is shown in FIG. 1 in a generally rectangular configuration. However, it is understood that the display 104 may be implemented in any shape, and may have any ratio of height to width. Also, for stylistic or design purposes, the display 104 may be curved or otherwise non-linearly shaped. Furthermore the display 104 may be flexible and configured to fold or roll.

The content presented on the display 104 may take the form of user input received when the user draws, writes, otherwise manipulates controls such as with the stylus. The content may also include electronic books or "eBooks." For example, the display 104 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 may have an input device controller 208 configured to accept input from a keypad, keyboard, or other user actuable controls 210. These user actuable controls 210 may have dedicated or assignable operations. For instance, the actuable controls may include page turning buttons, a navigational keys, a power on/off button, selection keys, joystick, touchpad, and so on.

The device 100 may also include a USB host controller 212. The USB host controller 212 manages communications between devices attached to a universal serial bus ("USB") and the processor 202 and other peripherals.

FIG. 2 further illustrates that the device 100 includes a touch sensor controller 214. The touch sensor controller 214 couples to the processor 202 via the USB host controller 212 (as shown). In other implementations, the touch sensor controller 214 may couple to the processor via the input device controller 208, inter-integrated circuit ("I²C"), universal asynchronous receiver/transmitter ("UART"), or serial peripheral interface bus ("SPI"), or other interfaces. The touch sensor controller 214 couples to the touch sensor 102. In some implementations multiple touch sensors 102 may be present.

The touch sensor 102 may comprise various technologies including interpolating force-sensing resistance (IFSR) sensors, capacitive, magnetic, force sensitive resistors, acoustic, optical, and so forth. The touch sensor 102 may be configured such that user input through contact or gesturing relative to the device 100 may be received.

The touch sensor controller 214 is configured to determine characteristics of interaction with the touch sensor. These characteristics may include the location of the touch on the touch sensor, magnitude of the force, shape of the touch, and so forth. In some implementations, the touch sensor controller 214 may provide some or all of the functionality provided by the input module 106, described below.

The magnetometer 118 may couple to the USB host controller 212, or another interface. The magnetometer 118, allows for the detection and characterization of an impinging magnetic field. For example, the magnetometer 118 may be configured to determine a field strength, angular bearing, polarity of the magnetic field, and so forth. In some implementations, the magnetometer may comprise a Hall-effect device. Magnetic fields, particularly in the environment within which electronic devices operate, are predictable and well understood. As a result, it becomes possible to use one or more magnetometers to determine presence and in some implementations the position, orientation, rotation, and so forth of the magnetic stylus. A plurality of magnetometers 118 may be used in some implementations.

One or more orientation sensors 120 may also be coupled to the USB host controller 212, or another interface. The orientation sensors 120 may include accelerometers, gravimeters, gyroscopes, proximity sensors, and so forth. Data from the orientation sensors 120 may be used at least in part to determine the orientation of the user relative to the device 100. Once an orientation is determined, input received by the device may be adjusted to account for the user's position. For example, when the user is holding the device in a portrait orientation the left and right edges of the touch sensor the input module 106 designates these areas as likely holding touch areas. Thus, touches within those areas biased in favor of being categorized as holding touches, rather than input touches.

The USB host controller 212 may also couple to a wireless module 216 via the universal serial bus. The wireless module 216 may allow for connection to wireless local or wireless wide area networks ("WWAN"). Wireless module 216 may include a modem 218 configured to send and receive data wirelessly and one or more antennas 220 suitable for propagating a wireless signal. In other implementations, the device 100 may include a wired network interface.

The device 100 may also include an external memory interface ("EMI") 222 coupled to external memory 224. The EMI 222 manages access to data stored in external memory 224. The external memory 224 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 224 may store an operating system 226 comprising a kernel 228 operatively coupled to one or more device drivers 230. The device drivers 230 are also operatively coupled to peripherals 204, such as the touch sensor controller 214. The external memory 224 may also store data 232, which may comprise content objects for consumption on eBook reader device 100, executable programs, databases, user settings, configuration files, device status, and so forth. Executable instructions comprising an input module 106 may also be stored in the memory 224. The input module 106 is configured to receive data from the touch sensor controller 214 and generate input strings or commands. In some implementations, the touch sensor controller 214, the operating system 226, the kernel 228, one or more of the device drivers 230, and so forth, may perform some or all of the functions of the input module 106.

One or more batteries 234 provide operational electrical power to components of the device 100 for operation when the device is disconnected from an external power supply. The device 100 may also include one or more non-illustrated peripherals, such as a hard drive using magnetic, optical, or solid state storage to store information, a firewire bus, a Bluetooth™ wireless network interface, camera, global positioning system, PC Card component, and so forth.

Couplings, such as that between the touch sensor controller 214 and the USB host controller 212, are shown for emphasis. There are couplings between many of the components illustrated in FIG. 2, but graphical arrows are omitted for clarity of illustration.

Illustrative User Interfaces

Figure 3:
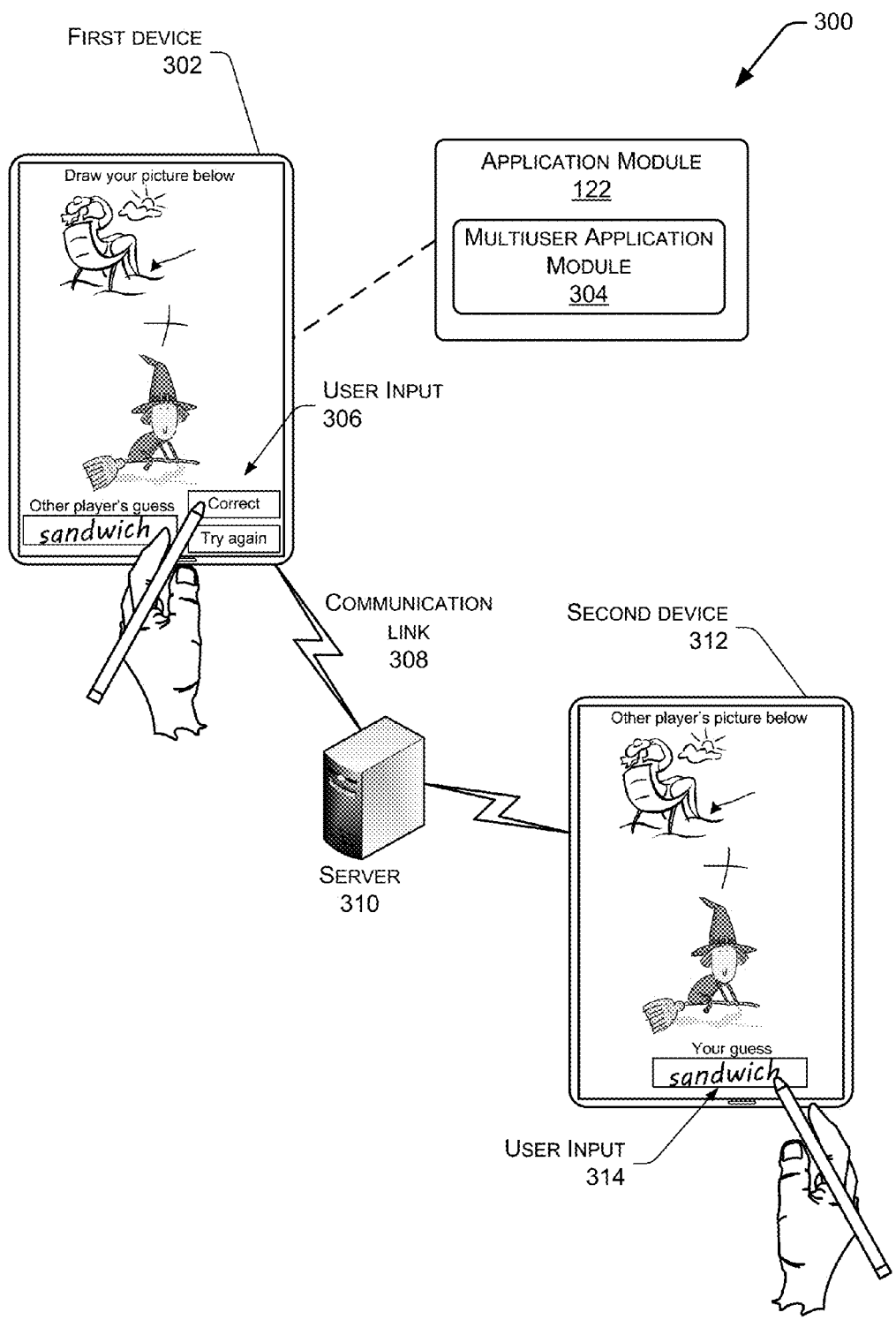
FIG. 3 depicts a pair of electronic devices with multiuser applications configured to communicate with one another.

FIG. 3 depicts a pair of electronic devices 300 with multiuser applications configured to communicate with one another. In this illustration, a first device 302 is shown with the application module 122, which in this example comprises a multiuser application module 304. The multiuser application module 304 is configured to provide interaction between two or more multiuser application modules 304 across a plurality of electronic devices. Here, the multiuser application module 304 is shown providing a drawing game. The user of the first device 302 may draw a picture on the first device with user input 306 such as the stylus 110 and touch sensor 102. A communication link 308 such as provided by the wireless module 216 couples the first device 302 with a server 310. The server 310 is configured to maintain communication between multiuser applications modules 304, provide other functions such as providing data storage, and so forth. The server in turn connects to a second device 312, such as via the wireless module 216 in that device. In some implementations, the first device 302 and the second device 312 may connect directly without an intermediary server.

In this example, via the communication link 308 and the server 310, the multiuser application module 304 of the second device 312 is configured to show the picture resulting from the user input 306 of the first user. The user of the second device 312 may then use the stylus 110 to provide user input 314 in the form of handwriting as to the guess of what the first user's picture is supposed to represent. As shown here, the multiuser application module 304 of the first device 302 may present the guess and accept input as to whether or not the guess is correct.

The multiuser application module 304 may be configured to provide other non-gaming functions. For example, a plurality of users may connect via the communication link 308 to contemporaneously sign a common contract. Or a plurality of users may be participating in the same educational presentation.

The processes in this disclosure may be implemented by the architectures described in this disclosure, or by other architectures. These processes described in this disclosure are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 4:
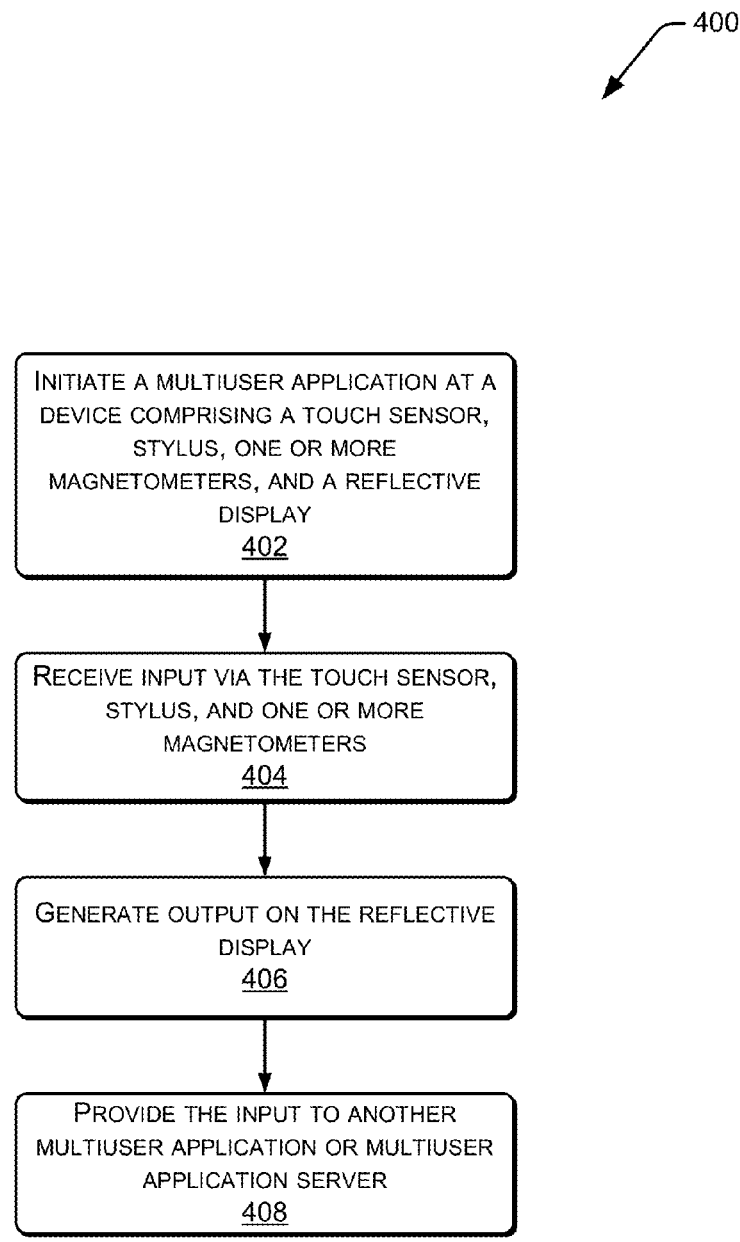
FIG. 4 is an illustrative process of distributing input across a plurality of electronic devices.

FIG. 4 is an illustrative process 400 of distributing input across a plurality of electronic devices. At 402, a multiuser application is initiated at a device comprising a touch sensor 102, magnetic stylus 110, and one or more magnetometers 118 configured to provide input, and a reflective display. At 404, the multiuser application receives input, such as from the touch sensor 102, the magnetic stylus 110, and the one or more magnetometers 118. At 406, output is generated on the reflective display. For example, the user input 306 on the first device 302 represents a user drawing on the display.

At 408, the input is provided to another multiuser application or multiuser application server 408. For example, the drawings made on the first device 302 are transferred to the second device 312, such as via the server 310. Thus, two or more electronic devices 100 may interact with one another.

Figure 5:
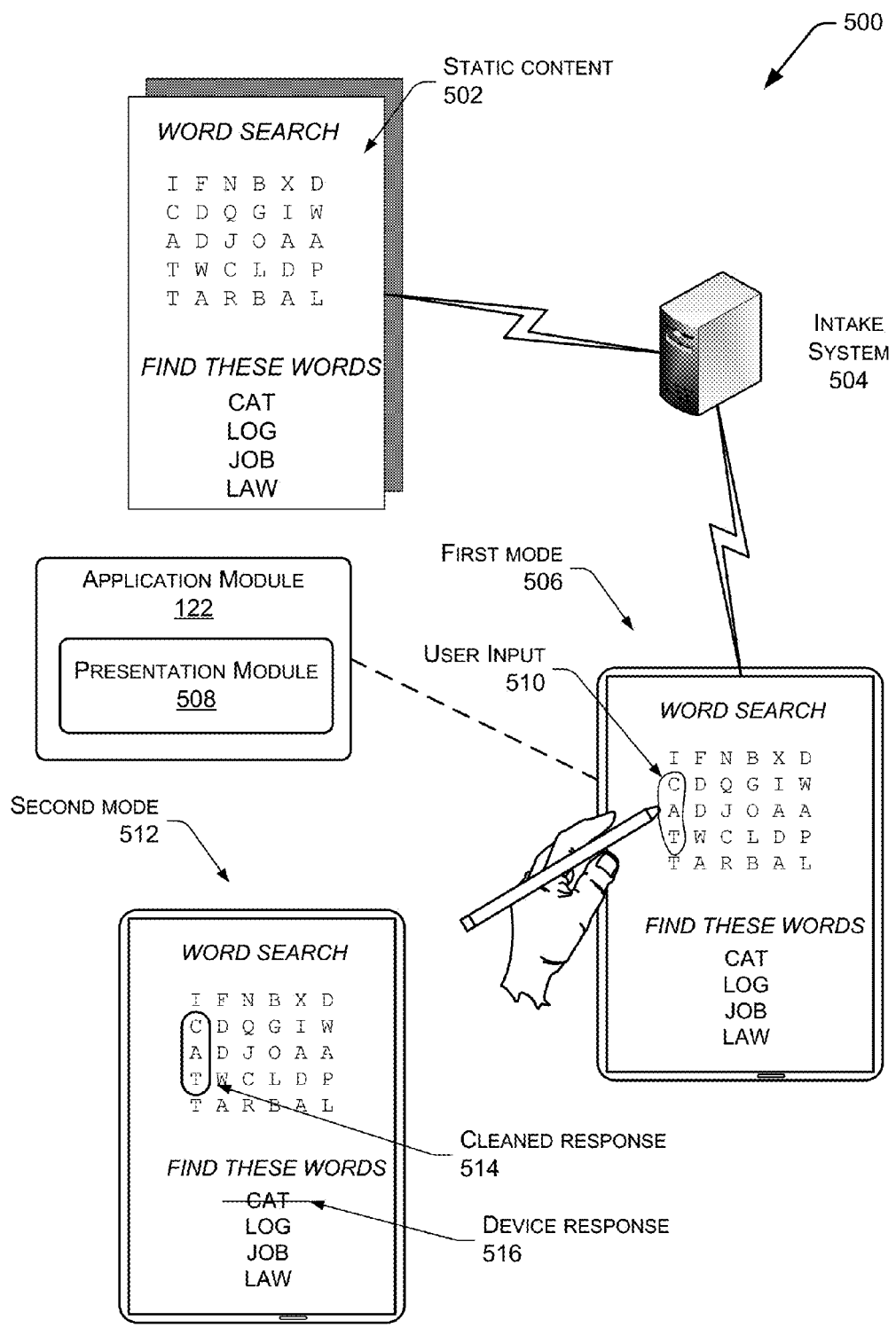
FIG. 5 depicts static content such as a pencil-and-paper or other type of printed game converted for use on the electronic device.

FIG. 5 depicts static content such as a pencil-and-paper or other printed game converted for use 500 on the electronic device. Static content is content that a user is able to annotate to make use of the content, with the annotations being rendered on the display along with the content. Static content includes, but is not limited to forms, crossword puzzles, Sudoku games, word searches, and so forth.

As shown in this illustration, static content 502 may be a page containing a word search game. An intake system 504 is configured to receive and process the static content 502 for presentation on the electronic device 100. This intake system 504 may be provided at least in part the application module 122 on the device 100, by a server, or a combination thereof. Processing of the static content 502 for presentation may be manual by a human, automated, or a combination thereof In one implementation, the intake system 504 may acquire a scanned image of the static content 502 or an electronic copy of a page. The intake system 504 may be configured to clean scanned images, recognize text, automatically align skewed content, and so forth. The intake system 504 may also determine the static content class and add dynamic elements appropriate to the content class. In this example, the intake system 504 has processed and provided the content to the electronic device 100.

In a first mode 506, a presentation module 508 accepts user input 510 such as circling a word in the word search. The presentation module 508 may be configured to clean up user inputs. As shown in the second mode 512, the user input 510 of a rough circle around a word has been replaced with a machine-generated cleaned response 514 of a regular and straight shape.

The intake system 504, the presentation module 508, or both may be configured to provide dynamic features to certain classes of static content. These dynamic features are user interface conventions which are associated with a particular class of content. For example, when the content is recognized as a word search, the circling of the word as user input 510 may result in a device response 516 wherein the device strikes through the circled word. Or where the content is recognized as a crossword, boxes on the page are configured to accept a single letter of text input. Other functions may also be provided. For example, by circling a word in the "find" list, the presentation module 508 may generate a device response 516 which provides a hint as to a location of the word in the word search. The device response 516 as well the cleaned response 514 are superimposed with the static content as presented on the reflective display. As a result, the user may see on the display the static content 502 as well as their inputs and the device responses.

Figure 6:
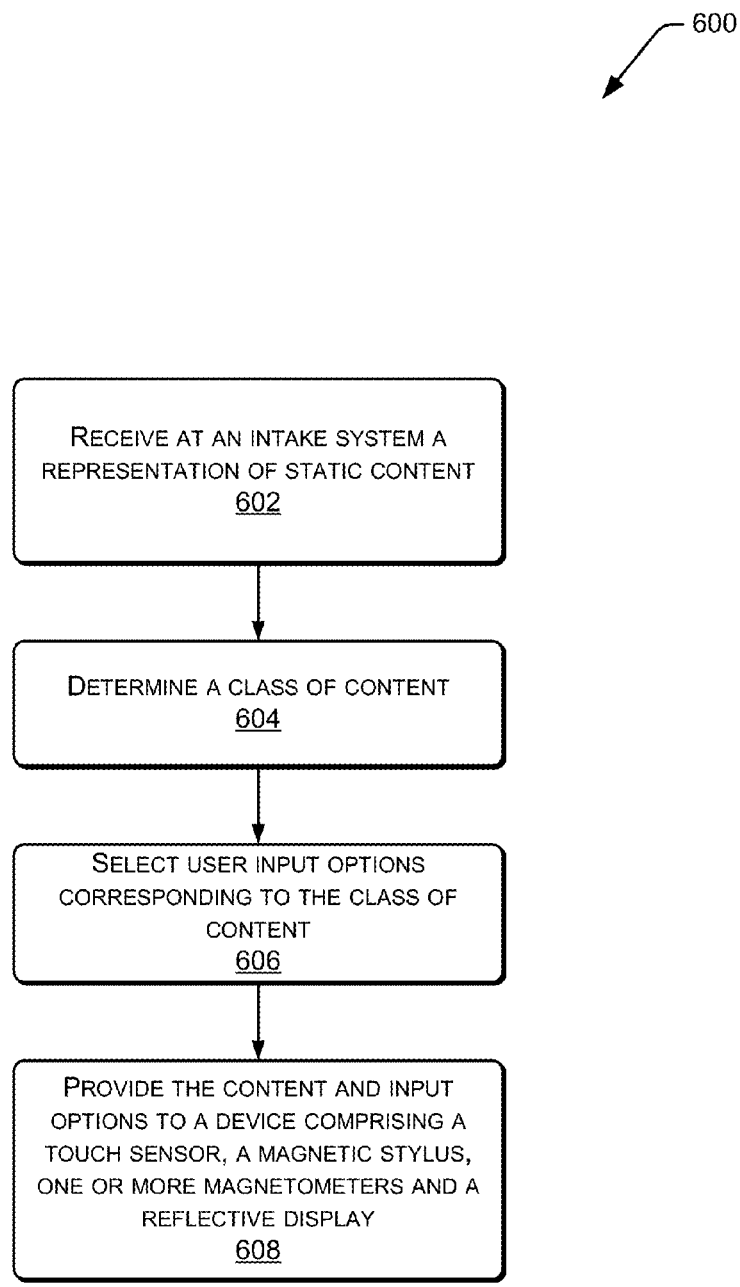
FIG. 6 is an illustrative process of receiving and providing the static content on the electronic device.

FIG. 6 is an illustrative process 600 of receiving and providing the static content on the electronic device. At 602, an intake system receives a representation of static content. For example, this representation may comprise a scanned image, electronic copy including formatting coding, and so forth.

At 604, a class of content is determined. The class of content may include, but is not limited to, a form, game, or document having particular usage parameters. For example, a page may be recognized as containing a word search class of content.

At 606, user input options corresponding to the class of content are selected. The user input options are ways of interacting with the class of content which are generally recognized. The user input options represent user interface conventions which are typical of the class of content. For example, where the class of content comprises a game, particularly a word search, the user input options may comprise crossing out words, circling words, searching for words on the page in a mixed two-dimensional array, and so forth.

At 608, the content and input options are provided to a device comprising the touch sensor 102, the magnetic stylus 110, the one or more magnetometers, and the display 104. For example, the electronic device 100 as described above may present the word search as shown in FIG. 5.

Figure 7:
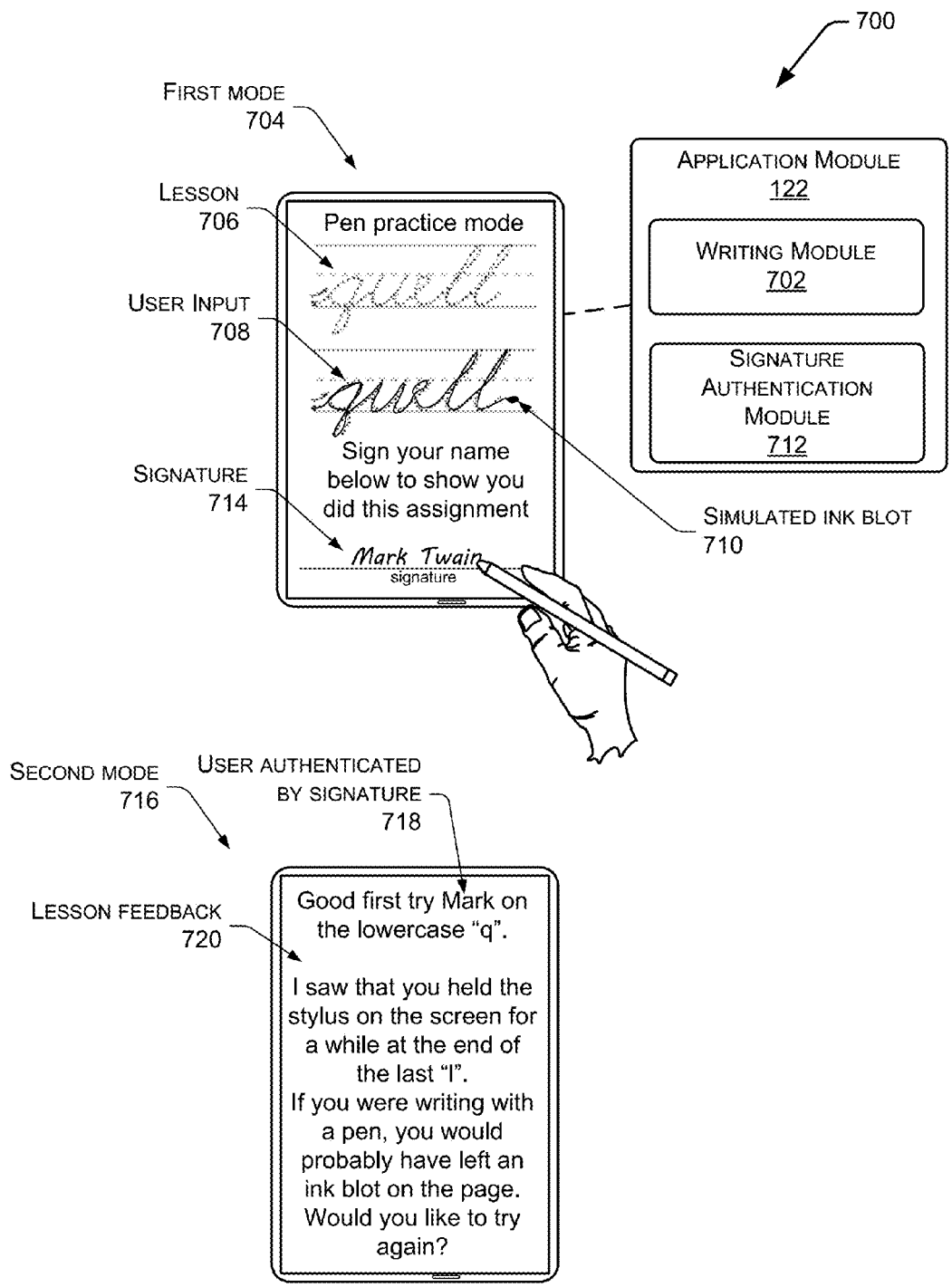
FIG. 7 depicts the device configured to provide writing training and configured to authenticate a signature.

FIG. 7 depicts the device configured 700 to provide writing training and also authenticating a signature. As mentioned above, the data available from the magnetic stylus 110 and the touch sensor 102 allows determination of the position and orientation of the stylus. When the touch sensor 102 is pressure sensitive, such as with an IFSR touch sensor 102, pressure profile data may also be obtained.

In this depiction, the application module 122 includes a writing module 702. As shown here in the first mode 704, the writing module 702 is configured to present a lesson 706 and accept user input 708. The lesson may comprise one or more exercises calling for the user to manipulate the stylus to generate characters, ideograms, symbols, and so forth. This lesson may also provide training for the use of the device 100 and available input modes.

The writing module 702 may be configured to simulate the performance of various writing implements. As shown here, an ink pen may be simulated, resulting in a simulated ink blot 710 where the user has paused with the stylus tip 112 in contact with the touch sensor 102 for a pre-determined period of time.

The data available regarding the user's handwriting may be used to provide signature authentication. The user may sign to identify themselves, record an acceptance of an end user license agreement or other contract, and so forth. As shown here, the application module 122 may also include a signature authentication module 712. This module 712 is configured to accept data about the stylus such as from the magnetometers 118 and touch sensor 102 to generate vector data about a user's signature 714. By comparing vector data of the signature 714 with previously stored data, the signature authentication module 712 may authenticate a particular user. The vector data may include amount of time spent during portions of the signature, velocity, angle, and so forth.

Continuing the example, as shown in the second mode 716 the writing module 702 is presenting the results of the lesson 706. Based on the signature 714, the signature authentication module 712 authenticated the user 718 as "Mark Twain" and has customized the results to reflect this user's name. Lesson feedback 720 may be presented. This lesson feedback 720 may provide details resulting from the vector data of the stylus motion, orientation, pressure, position, and so forth.

As mentioned above, in some implementations the lesson may be provided as part of a multiuser application. For example, the user may be writing their practice letters on one device while a human instructor reviews the practice letters on another workstation.

Figure 8:
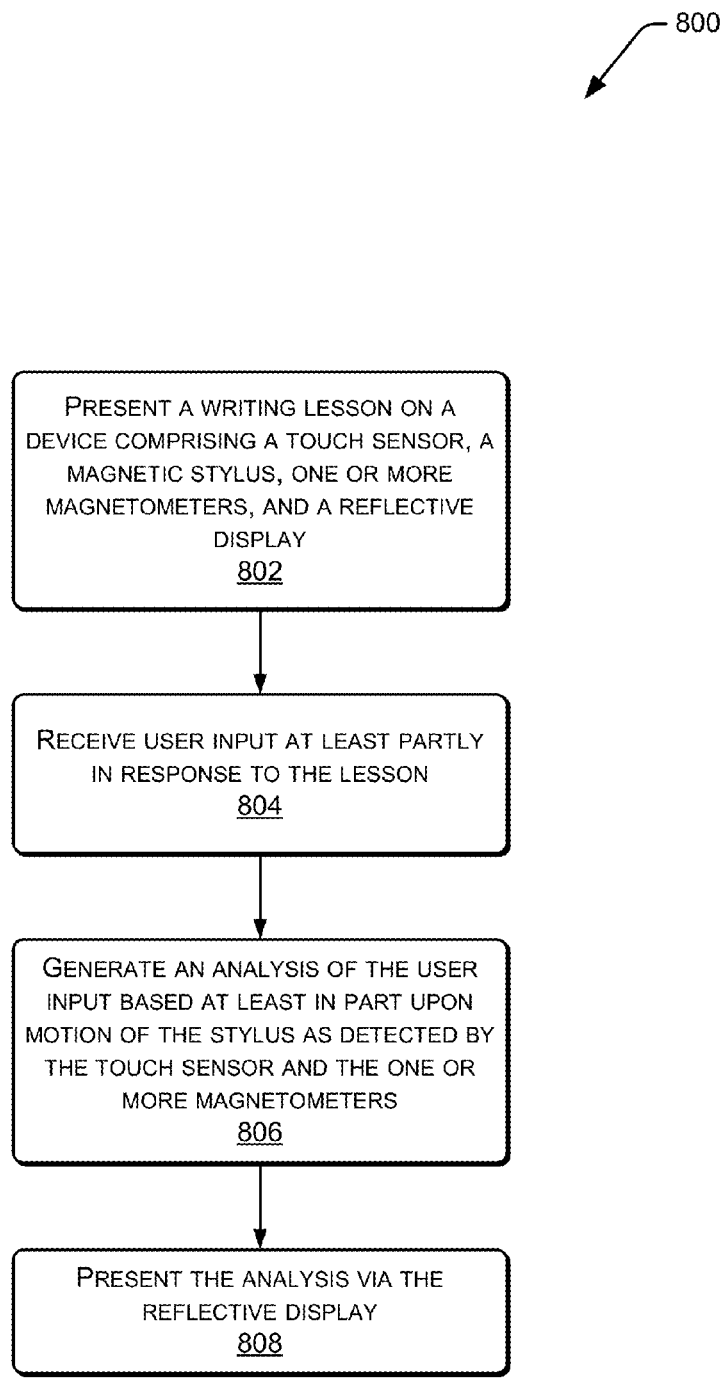
FIG. 8 is an illustrative process of providing the writing training on the electronic device.

FIG. 8 is an illustrative process 800 of providing the writing training on the electronic device. This process 800 may be performed by the writing module 702 as described above.

At 802, a writing lesson is presented on the device 100. As described above, the device 100 may comprise the touch sensor 102, the magnetic stylus 110, the one or more magnetometers 118, and the display 104.

At 804, user input is received at least partly in response to the lesson. For example, the user may be attempting to trace the letter "q" as presented on the display 104 with the stylus 110.

At 806, an analysis of the user input based at least in part upon the motion of the stylus as detected by the touch sensor and the one or more magnetometers is generated. At 808, the analysis is presented via the display 104. For example, as shown above with regards to FIG. 7, the lesson feedback 720 is shown.

Figure 9:
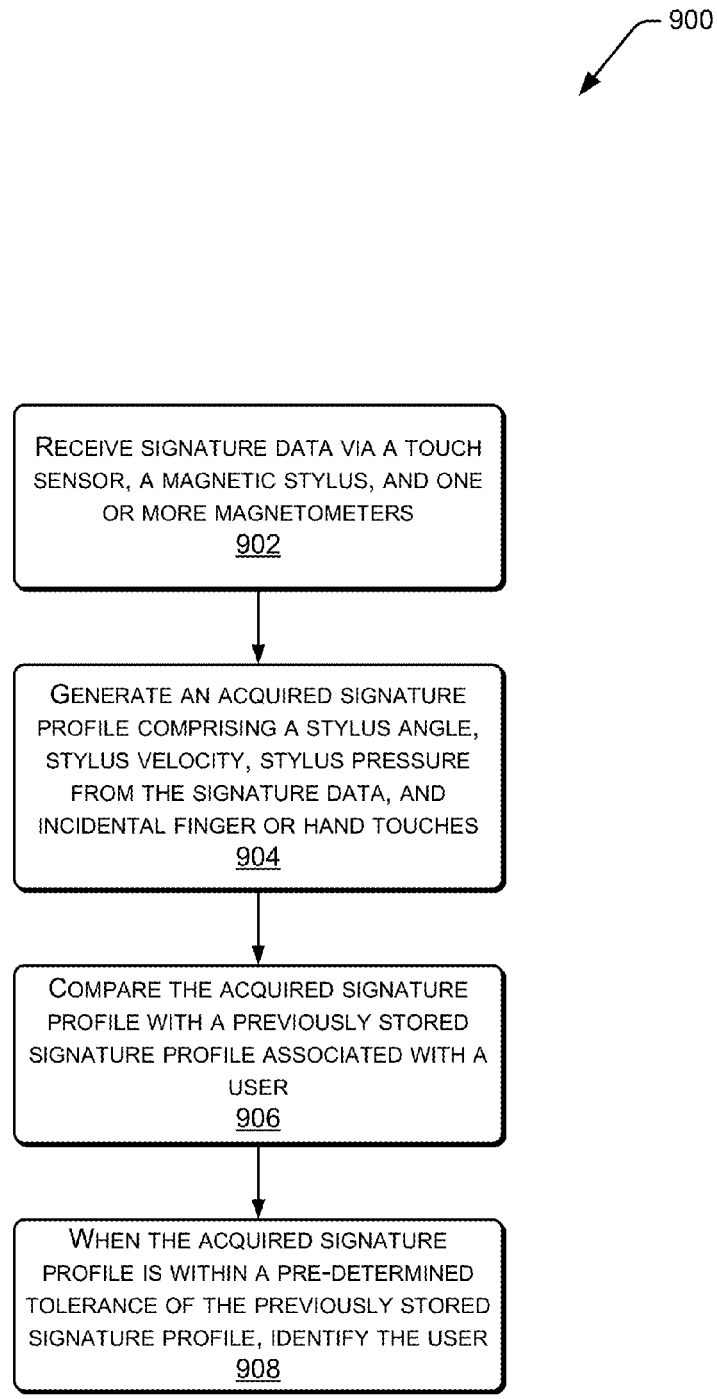
FIG. 9 is an illustrative process of authenticating a signature on the electronic device.

FIG. 9 is an illustrative process 900 of authenticating a signature on the electronic device. At 902, signature data is received via the touch sensor 102, the magnetic stylus 110, and the one or more magnetometers 118.

At 904, an acquired signature profile is generated from the signature data. This acquired signature profile may comprise a stylus angle, stylus velocity, stylus pressure from the signature data, incidental finger or hand touches, and so forth. This profile provides vector quantities about the signature. The incidental finger or hand touches are those which are incidental to the generation of the signature. For example, a particular user may habitually drag an edge of a hypothenar eminence of their writing hand along the touch sensor 102 while signing their signature.

At 906, the acquired signature profile is compared with a previously stored signature profile associated with a user. At 908, when the acquired signature profile is within a predetermined tolerance of the previously stored signature profile, the user is identified. For example, the acquired signature profile may have about a 95% correlation with the stored signature profile, and a match may be deemed to occur with the stored signature profile. In other implementations, other ranges of correlation may be permitted. For example, in some implementations the correlation may be between 40 and 100%.

Figure 10:
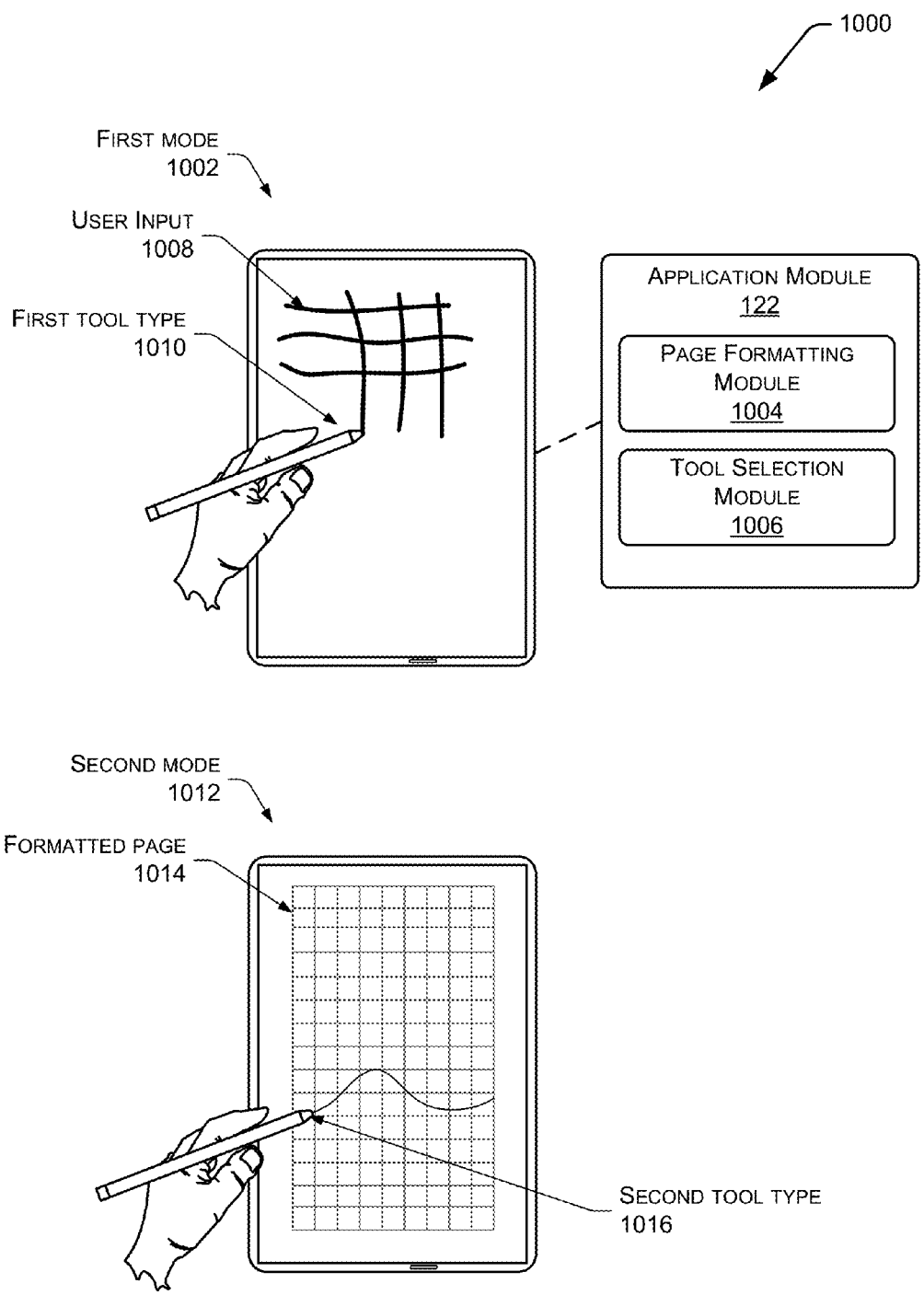
FIG. 10 depicts the device configured to present a page background on the display and provide a particular tool type in response to a user input.

FIG. 10 depicts the device configured 1000 to present a page background on the display and provide a particular tool type or configuration setting in response to a user input. As shown here, in a first mode 1002 the device is configured with a page formatting module 1004. The page formatting module 1004 is configured to provide page formatting such as a guideline background (e.g., gridded, lined, dotted, etc.), margins, layout, form formats (e.g., calendars, to-do lists, address entries, note-taking schemes, nomograph, etc.) and so forth. In addition to selecting a particular type of formatting, stylus-based user input, such as that illustrated in FIG. 10, may be used to further configure or revise previously selected formatting features by, for example, allowing the user to change size, style, shape, color, linewidth, etc. of a format feature.

A tool selection module 1006 may also be present and configured to set formatting parameters more directly related to the stylus used for input. These parameters may include line width, line pattern, line color or grayscale, and so forth. In some implementations they may also include simulated effects such as ink pooling, smearing, and so forth. Thus, the type of tool may be configured to simulate behavior of a physical or contrived marking tool.

User input 1008 may be used by the page formatting module 1004 to determine a page format for application. As shown here, the user has grown a crude grid with a first tool type 1010, such as a simulated felt-tip pen having a relatively large width. At least partly in response to the user input 1008, the page formatting module 1004 and the tool selection module 1006 may reconfigure the page format and tool type.

Shown here is a second mode 1012 where the page formatting module 1004 has interpreted the user input 1008 as a gesture associated with a Cartesian grid, generating a formatted page 1014 having a Cartesian grid. The stylus mode has also been modified by the tool selection module 1006 at least partly in response to the page format to that of a simulated mechanical pencil.

In some implementations the tool selection module 1006 may be configured to determine a particular tip shape or tip and adjust the stylus parameters accordingly. For example, a broader tip may correspond with a simulated felt-tip pen effect, while a narrower tip may correspond to a pencil.

Figure 11:
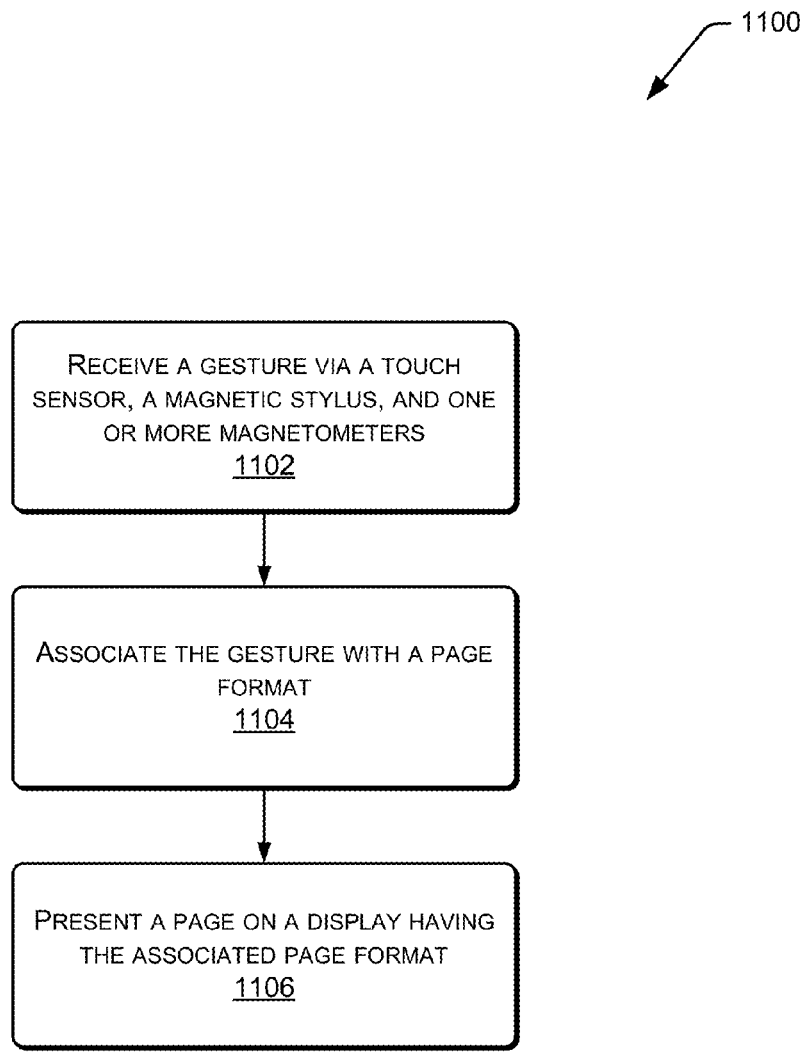
FIG. 11 is an illustrative process of providing the background on the reflective display.

FIG. 11 is an illustrative process 1100 of providing the background on the reflective display. As described above, the page formatting module 1004 may utilize the following process. At 1102, a gesture is received. This gesture may be received via the touch sensor 102, the magnetic stylus 110, the one or more magnetometers 118, or other input devices. At 1104, the gesture is associated with a page format. For example, as described above a crude handwritten grid may be associated with a Cartesian grid page layout.

At 1106, a page is presented on the display 104 having the associated page format. As described above, the display may comprise a reflective display such as an electrophoretic display upon which is presented the grid page layout.

Figure 12:
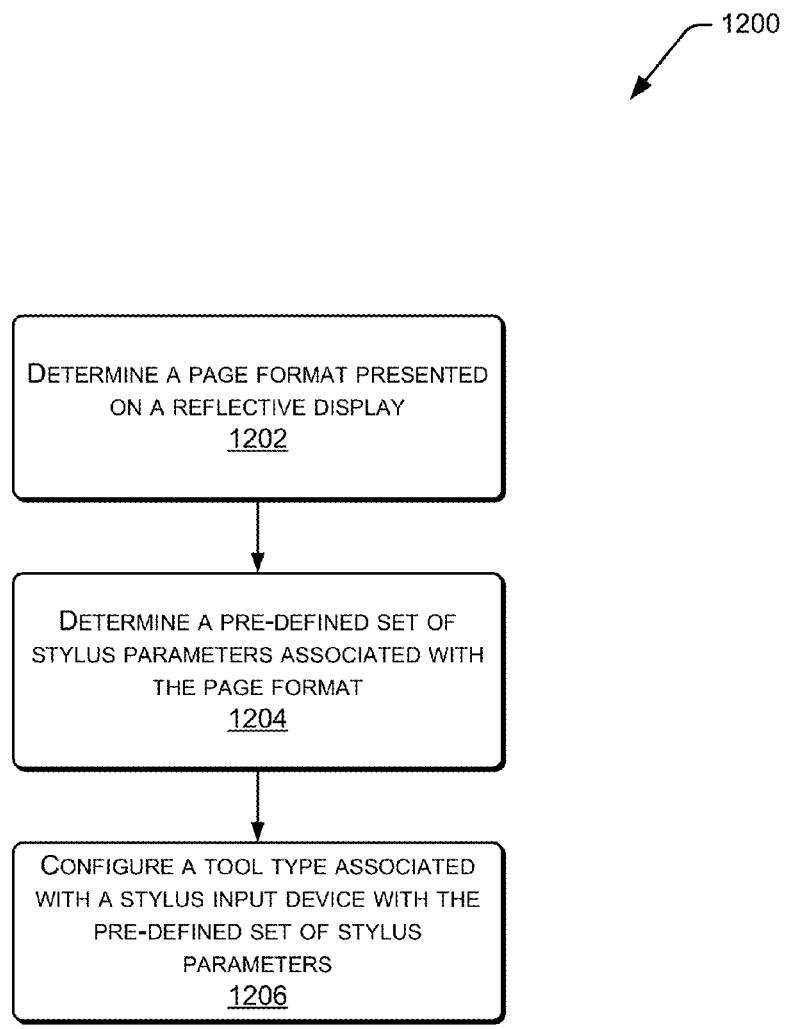
FIG. 12 is an illustrative process of configuring a stylus tool type.

FIG. 12 is an illustrative process 1200 of configuring a stylus tool type such as used by the tool selection module 1006. As described above, the stylus tool type may be configured to simulate a physical marking device, such as a pen, pencil, marker, and so forth.

At 1202, a page format as presented on the display is determined. For example, the tool selection module 1006 may receive data from the page formatting module 1004 indicating that the current page format is a Cartesian grid.

At 1204, a pre-defined set of stylus parameters associated with the page format is determined. These stylus parameters describe the response presented on the display 104 when stylus input is received. This stylus input may include data from the input module 106 such as position information determined by data from the magnetometers 118. The stylus parameters may include a line width, line pattern, smear characteristics, line color, and so forth. In some implementations the stylus parameters may also include topological or haptic characteristics, such as line height, texture, and so forth.

At 1206, a tool type associated with the stylus 110 is configured with the pre-defined set of stylus parameters. As described above with regards to FIG. 11, the tool type may be that of a simulated mechanical pencil, having stylus parameters associated with that mechanical pencil simulation.

Figure 13:
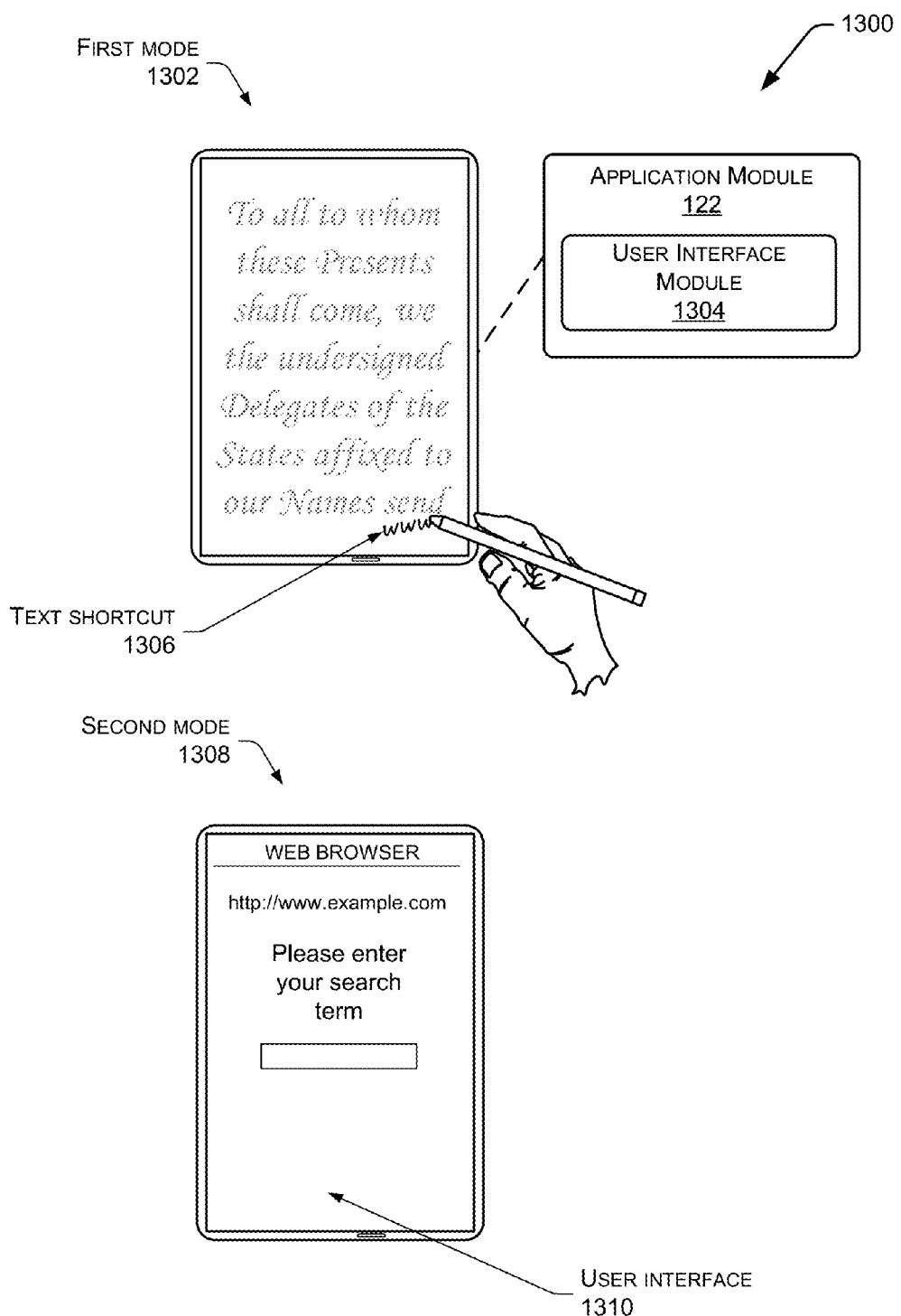
FIG. 13 depicts the device configured to receive a handwritten text shortcut and, in response, initiate a function.

FIG. 13 depicts the device configured 1300 to receive a handwritten text shortcut and initiating a function. Pull-down menus, control buttons, and so forth may be intrusive and distracting to a user. Handwritten textual shortcuts may be used to call pre-determined functions without these distractions.

As shown here, in a first mode 1302 the device 100 is presenting text. For example, the user may be reading an eBook. A user interface module 1304 is configured to monitor for handwritten text inputs via the stylus 110. Text comprises alphabetic, numeric, and punctuation marks used in a language selected by the user. For example, the set of text inputs for English may differ from French, German, Russian, Mandarin, and so forth.

The user interface module 1304 monitors the stylus inputs, and as shown here detects the user writing the letters "www". This combination of letters may have been previously configured to initiate a web browser, such as shown here in the second mode 1308. The user interface now depicts 1310 on the display 104 the active web browser application.

Figure 14:
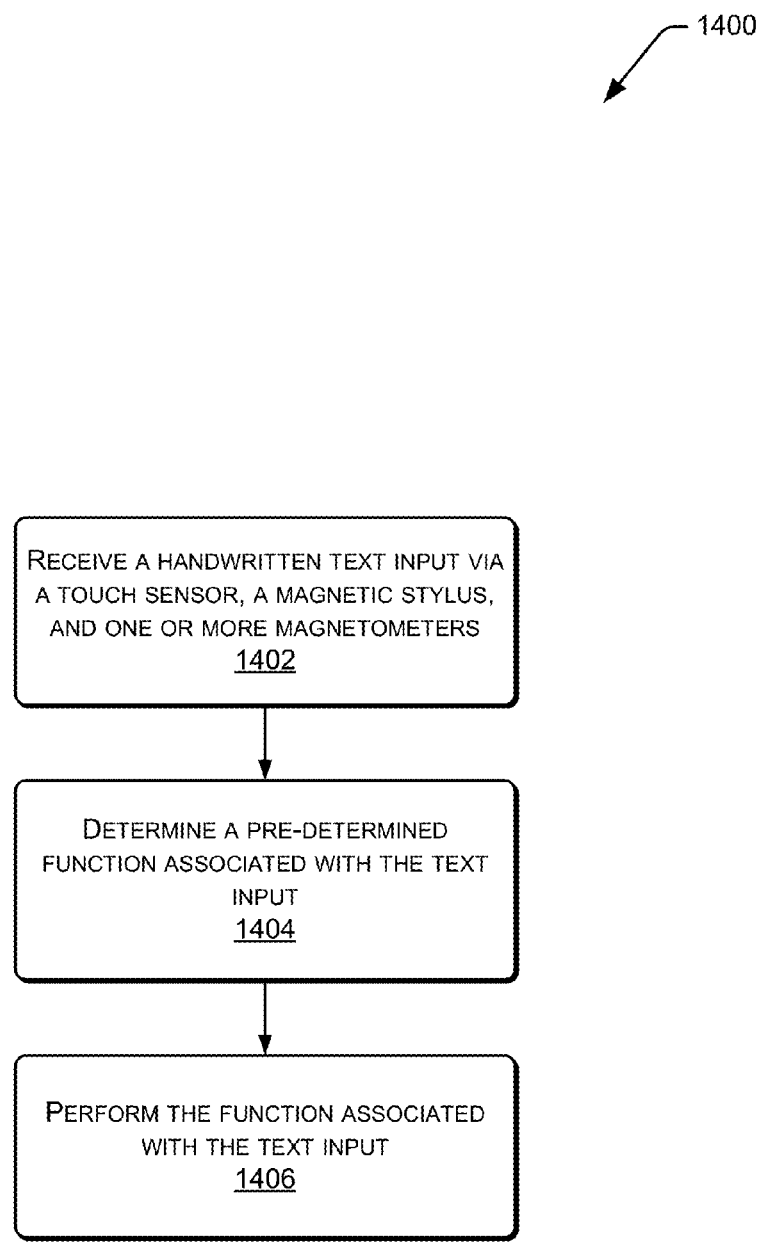
FIG. 14 is an illustrative process of performing a function in response to a handwritten text input.

FIG. 14 is an illustrative process 1400 of performing a function in response to a handwritten text input. As described above, this process may be performed by the user interface module 1304.

At 1402, a handwritten text input is received via the touch sensor 102, the magnetic stylus 110, and the one or more magnetometers 118. At 1404, a pre-determined function associated with the text input is determined. For example, the web browser initiation function may be associated with the "www" text input. In some implementations the pre-determined function may be context sensitive. For example, "www" written atop a word presented on the display 104 may result in opening a web browser with that word as a search term presented to a search engine, while "www" written in a margin may result in opening a web browser for general use. Other types of stylus entered text, e.g., symbols, words, trade names, etc., can be configured to initiate related activity. For example, a lowercase "az" written with the stylus may trigger execution of an application specific to using the amazon.com website, "+" written with the stylus may trigger activation of a calculator, and the like.

Characters from languages other than a default language on the device may also be used in some implementations. For example, in a device localized to the United States, entry of "¥" may trigger an application to display information about foreign currency, while the same device localized to Japan would not.

In another example, entry of a trademark such as "Coke®" may initiate an application configured to present the closest retail supplier of beverages from the Coca-Cola Company or otherwise search for a particular product or service. As shown in this last example, the use of special symbols such as "®", "™" or "©" may modify the pre-determined function. Thus, without the "®" symbol, the device may search for definitions of the entered word "coke" while inclusion of the "®" specifies a search for products available with that name.

At 1406, the function associated with the text input is performed. For example, the web browser is activated and presented on the display 104.

Figure 15:
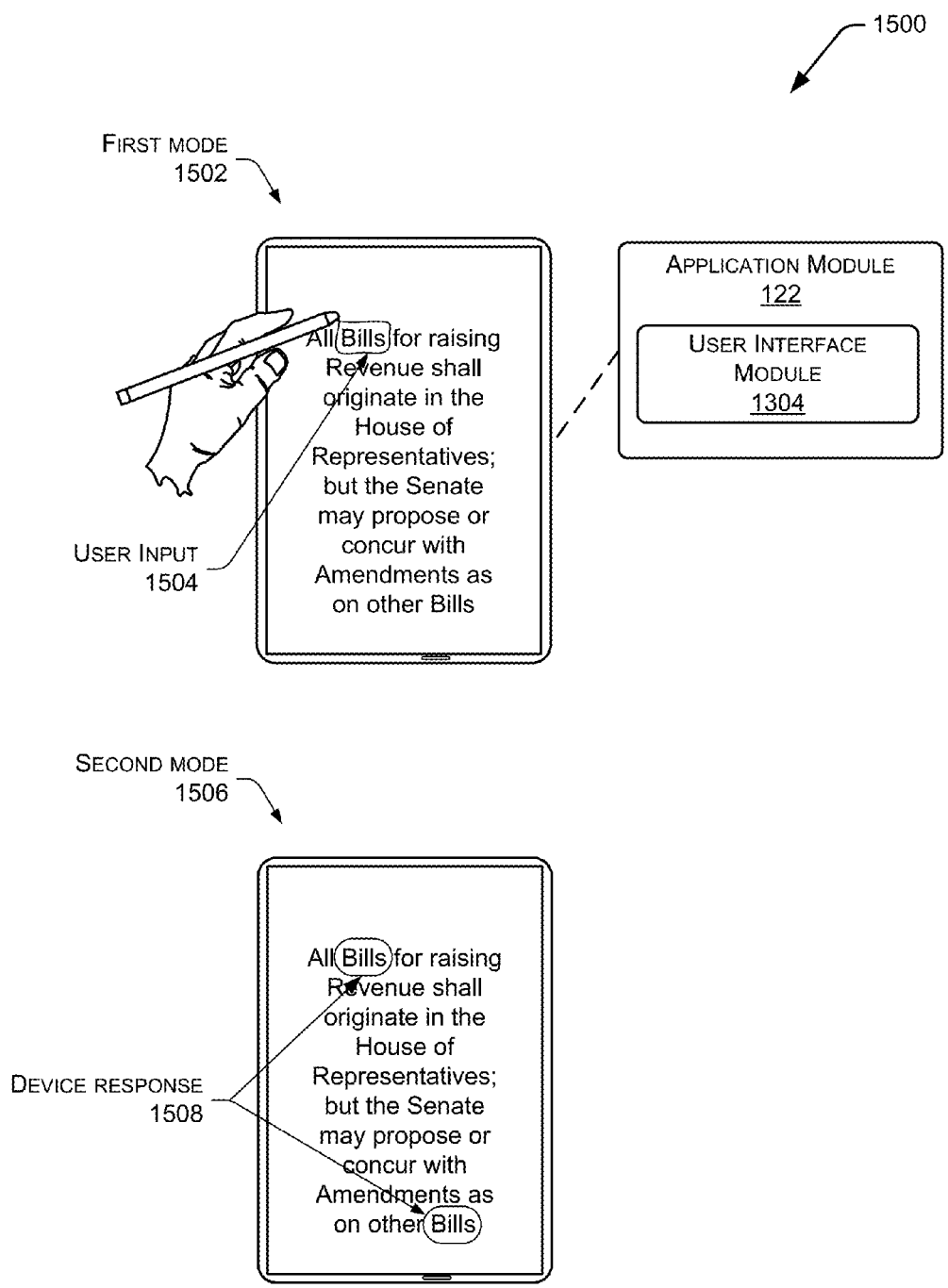
FIG. 15 depicts a stylus input initiating a search function.

Gestures may be configured to perform particular functions given the context of the gesture, page formatting, and so forth. FIG. 15 depicts a stylus input initiating 1500 a search function while the device is presented text. Other functions include, but are not limited to, looking up the word in the dictionary, thesaurus, tagging the word, generating a bookmark, adding the word to a list, and so forth. In a first mode 1502, the user interface module 1304 is presenting text, such as an eBook. A user input 1504 comprising a gesture of circling a particular word to select that word is received. Other selection gestures include underlining, striking-through text, drawing a geometric figure such as a box, and so forth. The user interface module 1304 may be configured to receive this gesture and initiate a search function for text matching the circled word.

As shown here, the device in a second mode 1506 has responded by cleaning up the user's input 1504 into a clean machine-generated circle around the first occurrence of the word "Bills" but has also circled a second occurrence of the word "Bills" on the page.

The above example is shown in the context of a page formatted to present text. In another context, such as a page formatted as a grid, the circling of a word may establish a hyperlink, change the color of the text, and so forth.

Figure 16:
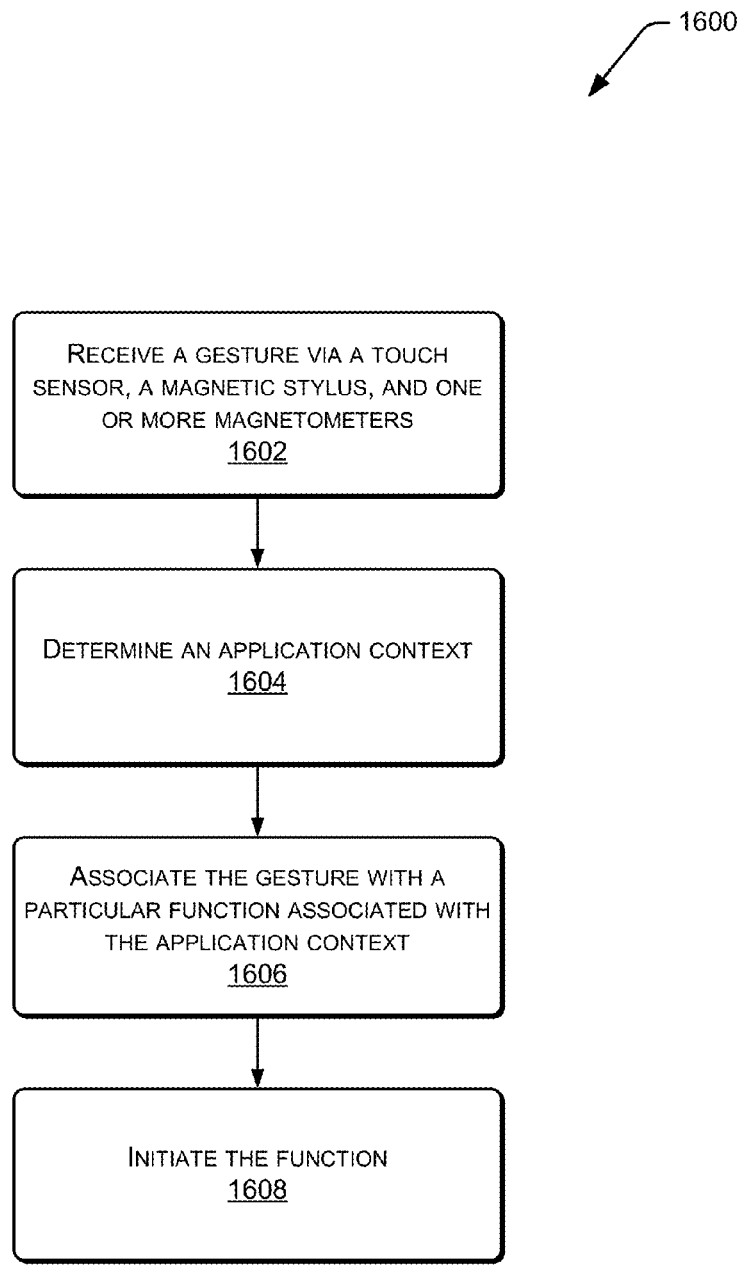
FIG. 16 is an illustrative process of initiating a function at least in part due to the context of data presented on the reflective screen and a gesture provided by the stylus.

FIG. 16 is an illustrative process 1600 of initiating a function at least in part due to the context of data presented on the reflective screen and a gesture provided by the stylus. As mentioned above, the user interface module 1304 may perform this process.

At 1602, a gesture is received via the touch sensor 102, the magnetic stylus 110, and the one or more magnetometers 118. This gesture may comprise data such as the touch point of the stylus tip 112 on the touch sensor 102, angle of the stylus 110 relative to the device, orientation of the stylus, and so forth.

At 1604, an application context is determined. For example, the page formatting may indicate the application context is a virtual notebook application with a grid configured to draw charts and graphs. Other application contexts include web browser, eBook reader, scientific calculator, word processing, and so forth.

At 1606, the gesture is associated with a particular function associated with the application context. For example, in the application context of the eBook reader, circling a word may be associated with the search function. At 1608, the function associated with the gesture is initiated. For example, the word search takes place.

Figure 17:
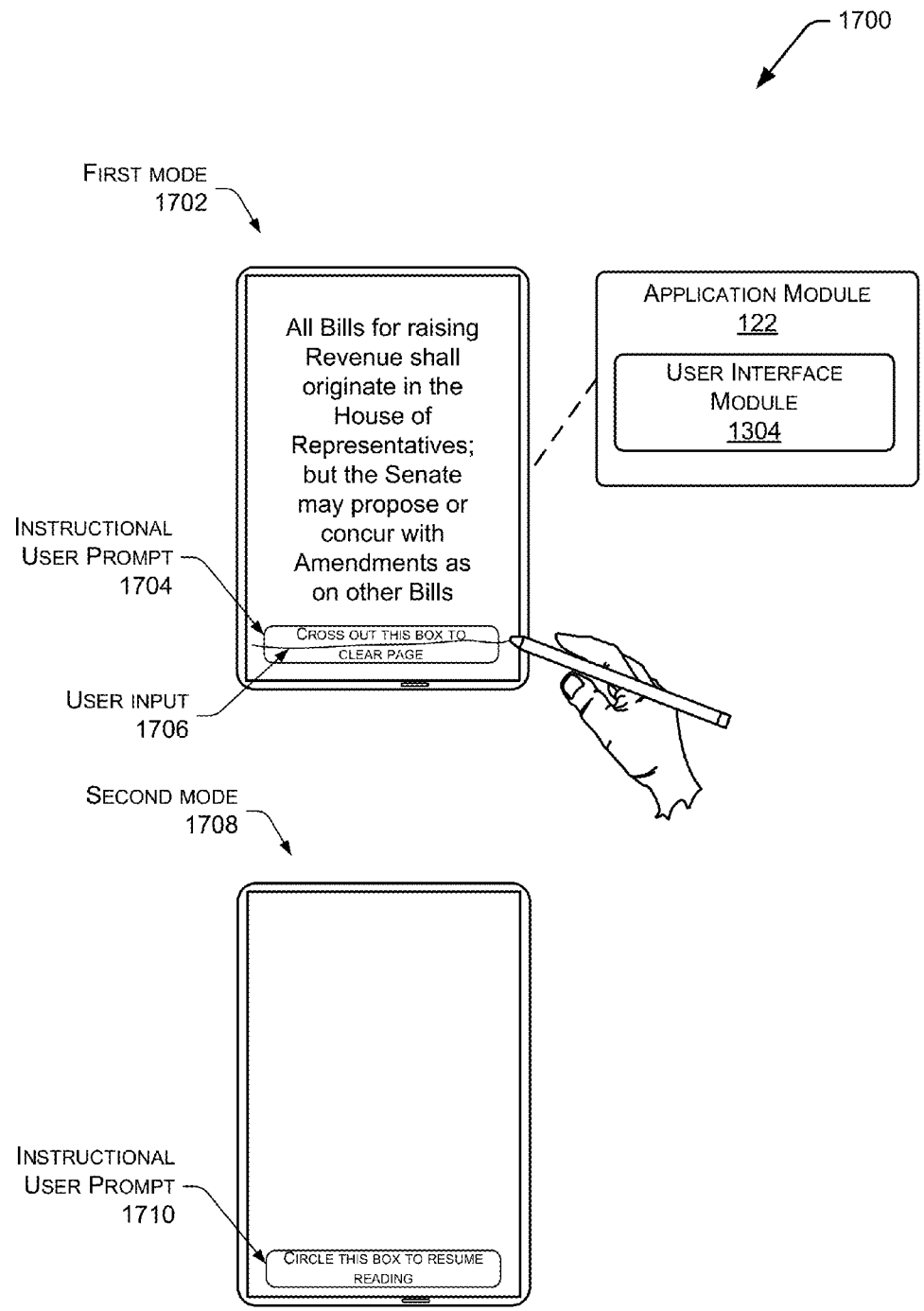
FIG. 17 depicts a user interface presenting an instructional user prompt.

FIG. 17 depicts a user interface 1700 presenting an instructional user prompt. User prompts or command options may be presented to users such that the instructions on how to use and the outcome are encapsulated therein. For example, as shown here in the first mode 1702, the user interface module 1304 is presenting an instructional user prompt 1704 with the text "cross out this box to clear page." While the instructional user prompt 1704 is depicted here as text within a box, in some implementations text alone may be presented. The instructional user prompt 1704 thus describes an action ("cross out this box") and an outcome ("clear page") within the prompt 1704.

As shown here, the user has used the stylus 110 on the touch sensor 102 to enter user input 1706 in the form of a line through the instructional user prompt 1704. While a single line horizontally is shown here, the user input 1706 may have been a vertical line, "X", and so forth.

After having received the user input 1706, the user interface module 1304 executed the clear command associated with the instructional user prompt 1704 and cleared the display 104 except for another instructional user prompt 1710. This instructional user prompt 1710 instructs the user to "circle to resume reading". By circling all or a portion of the instructional user prompt 1710, the user may be restored to the first mode 1702 showing the eBook.

Figure 18:
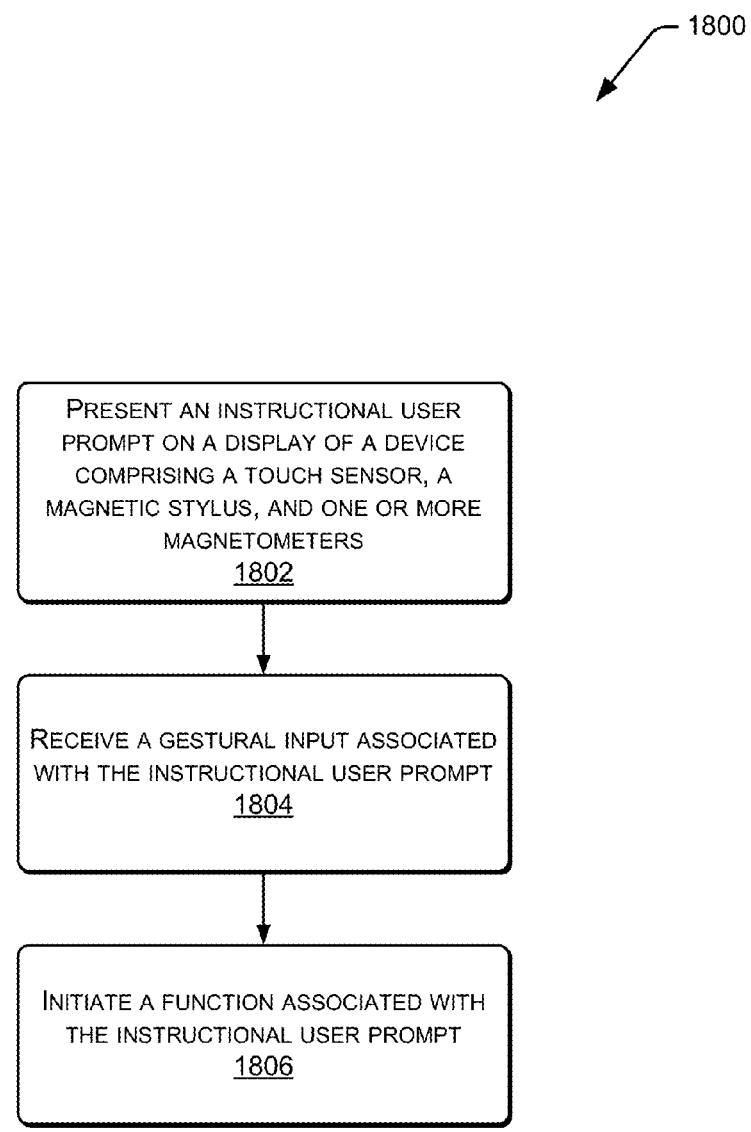
FIG. 18 is an illustrative process of the user interface providing an instructional user prompt and initiating a function in response to a directive provided in the instructional user prompt.

FIG. 18 is an illustrative process 1800 of the user interface providing an instructional user prompt and initiating a function in response to a directive provided in the instructional user prompt. As described above, the user interface module 1304 may implement this process.

At 1802, an instructional user prompt is presented on the display 104 of the device configured to receive input from the touch sensor 102, the magnetic stylus 110, and the one or more magnetometers 118. In some implementations, the instructional user prompt may comprise text containing an action or directive coupled with text describing an outcome or output. In other implementations, the instructional user prompt may comprise an illustration, series of illustrations presented contemporaneously, or animation comprising a series of sequentially presented illustrations.

At 1804, gestural input associated with the instructional user prompt is received by the stylus 110 and the touch sensor 102. For example, the user input 1706 of the user crossing out the instructional user prompt 1704.

At 1806, a function associated with the instructional user prompt is initiated. For example, as discussed above, the function of clearing the screen may be initiated.

Figure 19:
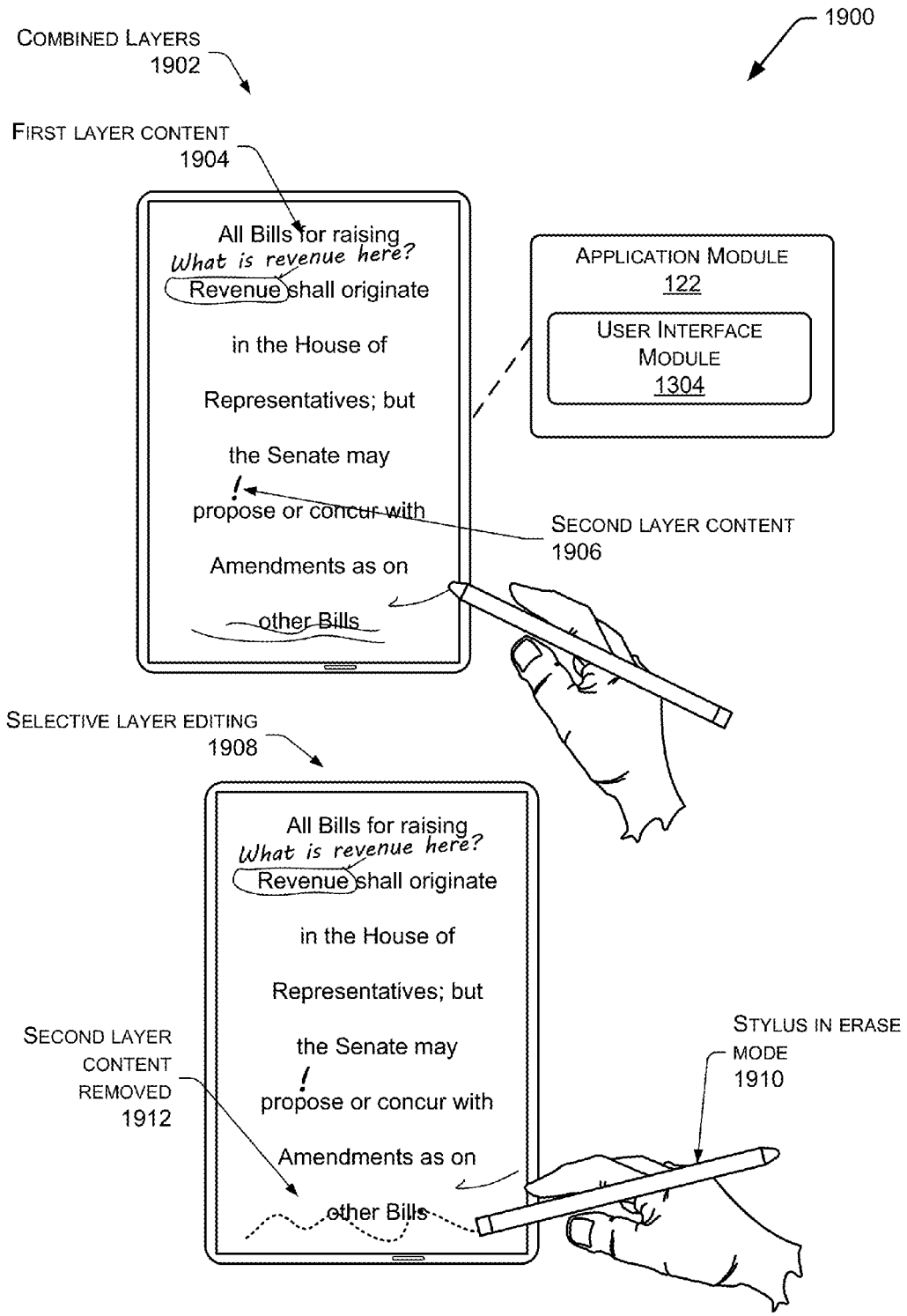
FIG. 19 depicts multiple content layers and editing a particular layer.

FIG. 19 depicts multiple content layers and editing a particular layer 1900. Content on the display 104 may be presented in one or more virtual layers. Gestures or other commands may act on an individual layer, a subset of layers, or on all layers simultaneously. As shown here, the user interface module 1304 may be configured to maintain layers and their manipulation.

The device 100 is shown with combined layers 1902 being presented. A first layer content 1904 such as text in an eBook is shown here, as is a second layer content 1906 such as the user's handwritten annotations.

While in selective layer editing 1908, the stylus has been placed in an erase mode 1910, such that the stylus end 114 is proximate to the touch sensor 102 and the display 104. While in this mode, the user interface module 1304 is configured to allow the user to remove or "erase" second layer content while leaving first layer content unaffected. Thus, as shown here, the user's manipulation of the stylus in the erase mode 1910 as indicated by the broken line has removed the second layer content 1912 comprising the previously handwritten underlines for the words "other bills." However, this erasing gesture did not affect the first layer content 1904.

Figure 20:
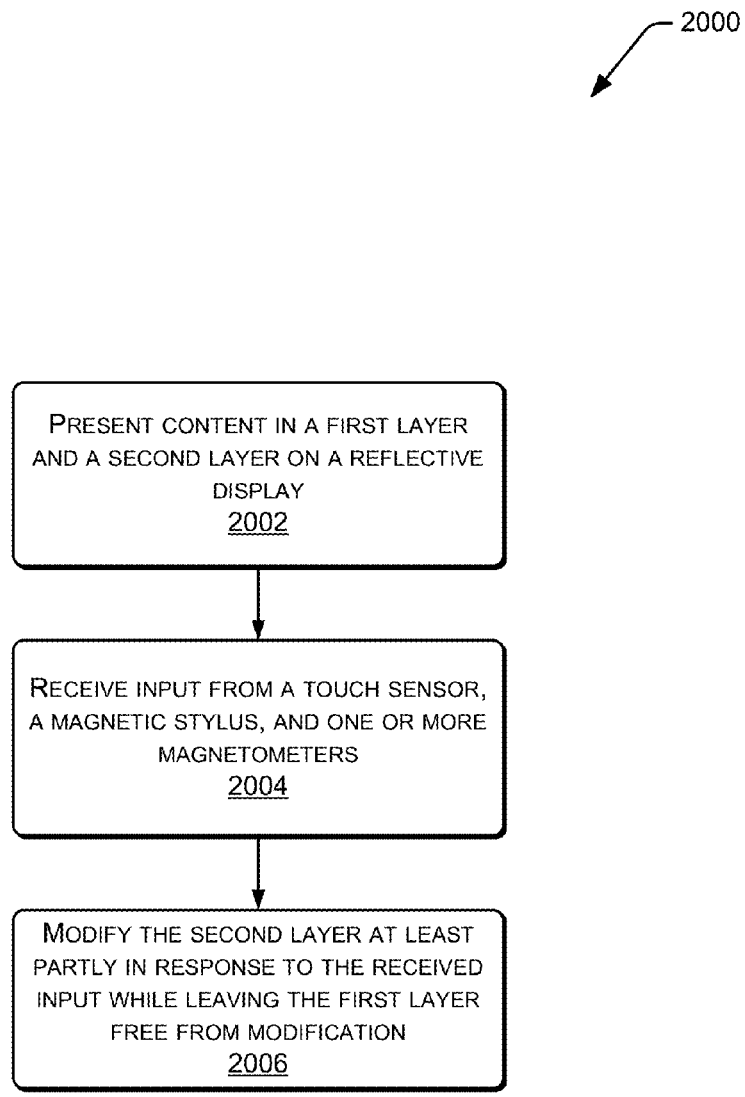
FIG. 20 is an illustrative process of the user interface presenting multiple content layers and selectively editing one or more of the layers.

FIG. 20 is an illustrative process 2000 of the user interface presenting multiple content layers and selectively editing one or more of the layers. At 2002, the user interface module 1304 presents on the display 104 content in a first layer and a second layer. For example, the eBook and the handwritten annotations may be presented on the electrophoretic display.

At 2004, input is received from the touch sensor 102, the magnetic stylus 110, and the one or more magnetometers 118. For example, the input may comprise the user placing the stylus into an erase mode and moving the stylus end 114 along a portion of the touch sensor 102 in an erasing gesture. At 2006, the second layer is modified at least partly in response to the received input while leaving the first layer free from modification.

Figure 21:
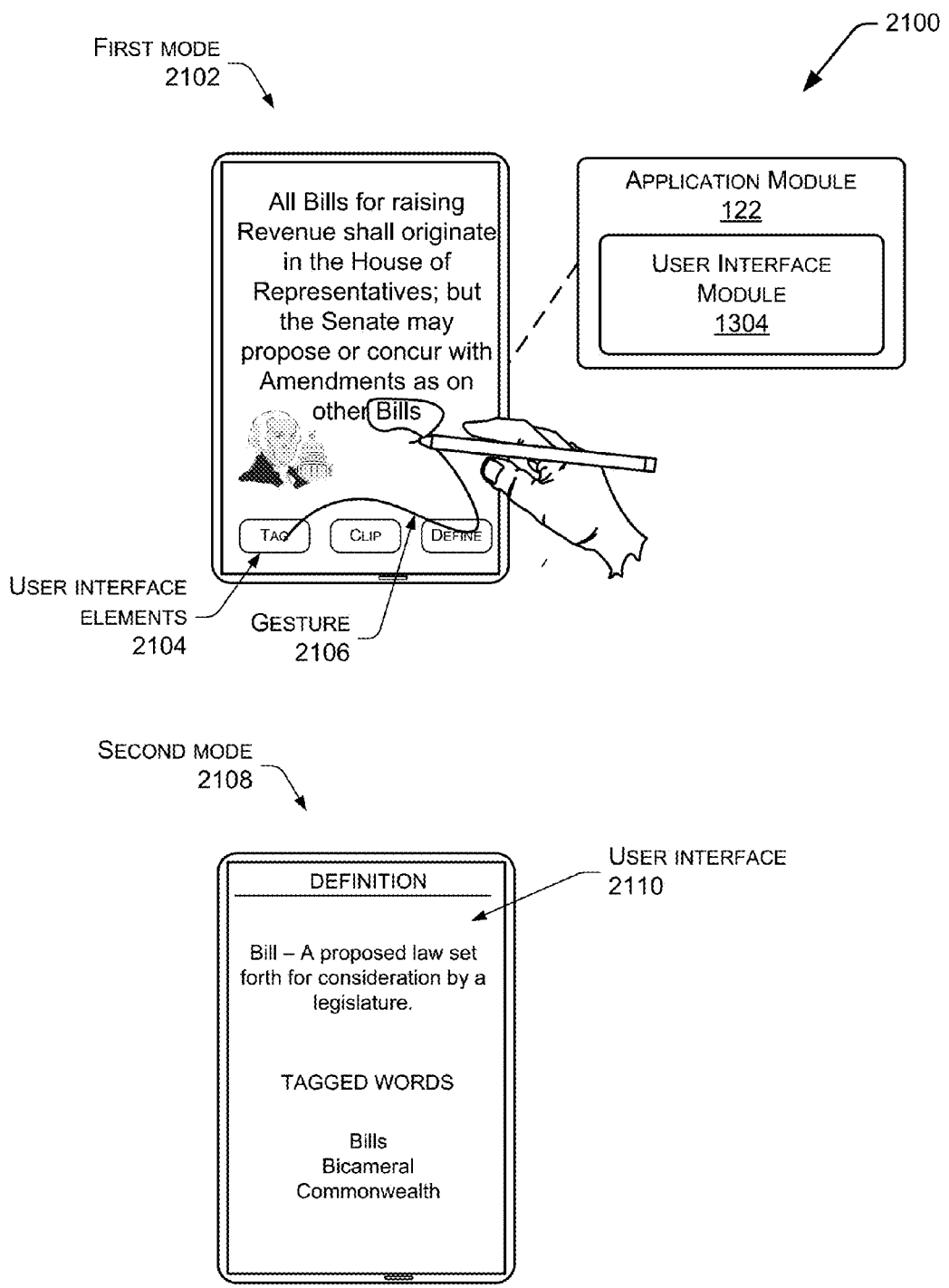
FIG. 21 depicts the user interface accepting topologically unambiguous gestures comprising drawing a line between two or more user interface elements.

FIG. 21 depicts the user interface 2100 accepting topologically unambiguous gestures comprising drawing a line between two or more user interface elements. Users may initiate functions using a topologically unambiguous path between two or more elements of the user interface, such as shown here.

In a first mode 2102, the device depicts a portion of an eBook on a display 104. A plurality of user interface elements 2104 are shown for various commands available in the user interface. A user gesture 2106 is shown comprising a line connecting two user interface elements with a word in the text. The two user interface elements are the "tag" and "define" commands and the gesture terminates with the word "Bills" being encircled. The line is topologically unambiguous in that it has a definite start and end point along a particular path. The gesture 2106 thus expresses the command to tag the encircled word and provide a definition for the encircled word.

A second mode 2108 depicts the results of these commands. The user interface module 1304 depicts a user interface 2110 of the definition for the word "Bill" and also displaying a list of tagged words.

By "connecting the dots" between the particular controls using the stylus 110 and the touch sensor 102, the user is thus able to initiate a particular function or set of functions. The topology or sequence of connection may also be used to designate the order in which those commands are initiated. For example, in this illustration the tagging function may be performed before the definition function. By drawing the line connecting the controls in a different sequence, a different sequence of functions may be initiated.

Figure 22:
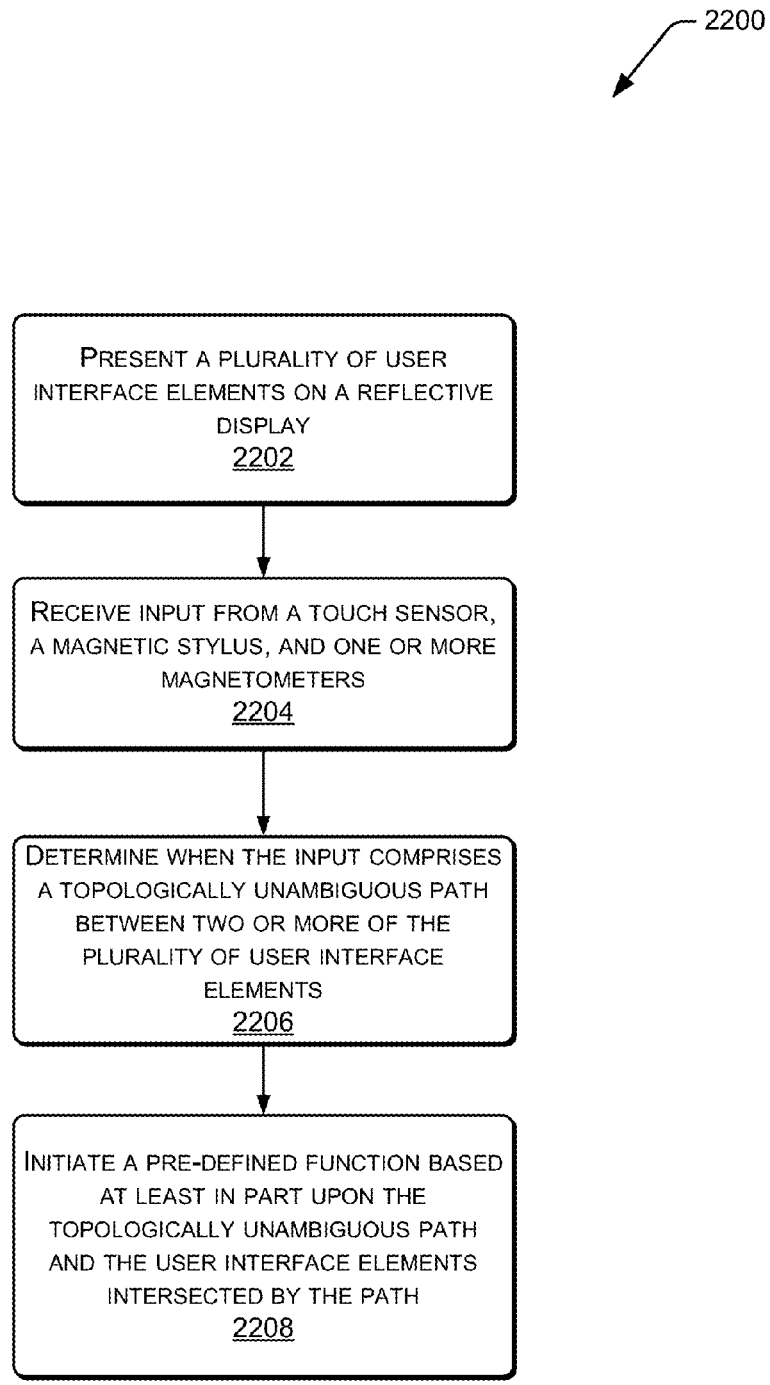
FIG. 22 is an illustrative process of the user interface receiving topologically unambiguous connective gestures and initiating a pre-defined function.

FIG. 22 is an illustrative process 2200 of the user interface receiving topologically unambiguous connective gestures and initiating a pre-defined function. As described above, the user interface module 1304 may be configured to use this process.

At 2202, a plurality of user interface elements are presented on the display 104. For example, the command associated with the eBook on the electrophoretic display.

At 2204, input is received from the touch sensor 102, the magnetic stylus 110, and the one or more magnetometers 118. At 2206, a determination is made as to when the input comprises a topologically unambiguous path between two or more of the plurality of user interface elements.

At 2208, a pre-defined function based at least in part upon the topologically unambiguous path and the user interface elements intersected by the path is initiated. As mentioned above, the sequence of initiation may be determined by the order of intersection. For example, the commands may execute in the order in which the stylus intersected them.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A device comprising:
a processor;
memory coupled to the processor;

one or more magnetometers disposed about the device and coupled to the processor;
a magnetic stylus configured with a magnetic field detectable to the one or more magnetometers;
a touch sensor coupled to the processor;
a reflective display coupled to the processor;
an application module stored in the memory and executable by the processor to:
present a writing lesson on the reflective display, the writing lesson instructing a user to use the magnetic stylus to write on the reflective display;
detect, via the touch sensor and the one or more magnetometers, user input on the reflective display;
performing an analysis of the user input based at least in part upon motion data received from the touch sensor and the one or more magnetometers, wherein the motion data includes a stylus angle, a stylus velocity, a stylus pressure, and an angular bearing of the magnetic stylus; and
present feedback pertaining to the writing lesson on the reflective display based at least in part on the analysis.

2. The device of claim 1, wherein the touch sensor comprises an interpolating force-sensing resistance sensor and the reflective display comprises an electrophoretic display.

3. The device of claim 1, wherein:
the writing lesson comprises one or more exercises in which the magnetic stylus is manipulated to generate an alphanumeric character.

4. The device of claim 1, wherein:
the writing lesson comprises one or more exercises in which the magnetic stylus is manipulated to generate an ideogram.

5. The device of claim 1, wherein:
the writing lesson comprises one or more exercises in which the magnetic stylus is manipulated to generate a symbol.

6. The device of claim 1, wherein the magnetic stylus is configured to simulate an ink pen.

7. The device of claim 1, wherein the application module is further executable by the processor to:
display a simulated ink blot in response to determining that a tip of the magnetic stylus has been in contact with the touch sensor for more than a predetermined period of time.

8. The device of claim 1, wherein the application module is further executable by the processor to:
authenticate a signature generated by the magnetic stylus based on comparing vector data of the signature with previously stored data, the vector data including:
an amount of time spent during one or more portions of generating the signature,
a velocity of the magnetic stylus when generating the signature, and
an angle of the magnetic stylus when generating the signature.

9. A device comprising:
a processor;
memory coupled to the processor;
one or more magnetometers disposed about the device and coupled to the processor;
a magnetic stylus configured with a magnetic field detectable to the one or more magnetometers;
a touch sensor that is coupled to the processor;
a reflective display coupled to the processor;
an application module stored in the memory and executable by the processor to:
receive signature data generated by movement of the magnetic stylus, the signature data received from the touch sensor and the one or more magnetometers;
generate, based at least partly on the signature data, a signature profile comprising a stylus angle, a stylus velocity, a stylus pressure, and an angular bearing of the magnetic stylus;
compare the signature profile with a previously stored signature profile associated with a user; and
identify the user based at least in part on determining that the signature profile is within a pre-determined tolerance of the previously stored signature profile.

10. The device of claim 9, wherein the touch sensor comprises an interpolating force-sensing resistance sensor and the reflective display comprises an electrophoretic display.

11. The device of claim 9, the application module further executable to:
present a writing lesson instructing a user to use the magnetic stylus to write on the reflective display;
detect via the touch sensor and the one or more magnetometers, user input on the reflective display;
perform an analysis of the user input based at least in part upon motion data received from the touch sensor and the one or more magnetometers; and
present feedback pertaining to the writing lesson on the reflective display based at least in part on the analysis.

12. The device of claim 11, wherein:
the writing lesson comprises one or more exercises in which the magnetic stylus is manipulated to generate an alphanumeric character or an ideogram.

13. The device of claim 11, wherein:
the writing lesson comprises one or more exercises in which the magnetic stylus is manipulated to generate a symbol.

14. The device of claim 11, wherein the magnetic stylus is configured to simulate an ink pen.

15. The device of claim 11, wherein the application module is further executable by the processor to:
display a simulated ink blot in response to determining that a tip of the magnetic stylus has been in contact with the touch sensor for more than a predetermined period of time.

16. The device of claim 11, wherein the application module is further executable by the processor to:
authenticate a signature generated by the magnetic stylus based on comparing vector data of the signature with previously stored data, the vector data including:
an amount of time spent during one or more portions of generating the signature,
a velocity of the magnetic stylus when generating the signature, and
an angle of the magnetic stylus when generating the signature.

17. One or more non-transitory computer-readable storage media to store instructions that are executable by one or more processors to perform acts comprising:
presenting a writing lesson on a reflective display of an electronic book (eBook) reader device, the writing lesson instructing a user to use a magnetic stylus to write on the reflective display;
detecting, from both a touch sensor of the eBook reader device and a plurality of magnetometers disposed around the eBook reader device to detect manipulation of a magnetic field generated by the magnetic stylus, user input on the reflective display;
determining an orientation of the magnetic stylus;

adjusting the user input based at least in part of the orientation of the magnetic stylus;

performing, based at least in part upon motion data received from the touch sensor and the plurality of magnetometers, an analysis of the user input to determine that the writing lesson was performed correctly, wherein the motion data includes a stylus angle, a stylus velocity, a stylus pressure, and an angular bearing of the magnetic stylus; and displaying, on the reflective display, an indication that the writing lesson was performed correctly.

18. The one or more non-transitory computer-readable storage media of claim 17, wherein:

the touch sensor comprises an interpolating force-sensing resistance (IFSR) sensor; and the reflective display comprises an electrophoretic display.

19. The one or more non-transitory computer-readable storage media of claim 17, wherein:

the writing lesson comprises one or more exercises in which the magnetic stylus is manipulated to generate at least one of an alphanumeric character, an ideogram, or a symbol.

20. The one or more non-transitory computer-readable storage media of claim 17, wherein:

the magnetic stylus is configured to simulate an ink pen.

21. The one or more non-transitory computer-readable storage media of claim 17, the acts further comprising:

displaying a simulated ink blot in response to determining that a tip of the magnetic stylus has been in contact with the touch sensor for more than a predetermined period of time.

22. The one or more non-transitory computer-readable storage media of claim 17, the acts further comprising:

authenticating a signature generated by the magnetic stylus based on comparing vector data of the signature with previously stored data, the vector data including:

an amount of time spent generating one or more portions of the signature, a velocity of the magnetic stylus when generating the signature, and an angle of the magnetic stylus when generating the signature.

23. A method performed by one or more processors that are configured with instructions to perform acts comprising:

presenting a writing lesson on a reflective electrophoretic display of an electronic book (eBook) reader device, the writing lesson instructing a user to use a stylus to write on the reflective electrophoretic display;

receiving user input from one or more magnetometers disposed around the eBook reader device, wherein the one or more magnetometers detect manipulation of a magnetic field generated by a magnetic stylus on the reflective electrophoretic display;

determining an orientation of the magnetic stylus;

adjusting the user input based at least in part of the orientation of the magnetic stylus;

determining that the writing lesson was performed correctly based at least in part on motion data received from a touch sensor of the eBook reader device and from the one or more magnetometers, wherein the motion data includes a stylus angle, a stylus velocity, a stylus pressure, and an angular bearing of the magnetic stylus; and displaying, on the reflective electrophoretic display, an indication that the writing lesson was performed correctly.

24. The method of claim 23, wherein:

the user input is at least partly received using an interpolating force-sensing resistance (IFSR) sensor.

25. The method of claim 23, wherein:

the user input includes at least one of an alphanumeric character, an ideogram, or a symbol.

26. The method of claim 23, wherein:

the magnetic stylus is configured to simulate an ink pen.

27. The method of claim 26, the acts further comprising:

in response to determining that a tip of the magnetic stylus has been in contact with a touch sensor for more than a predetermined period of time, displaying a simulated ink blot.

28. The method of claim 23, the acts further comprising:

authenticating a signature generated by the magnetic stylus based on vector data comprising:

an amount of time spent during one or more portions of generating the signature, a velocity of the magnetic stylus when generating the signature, and an angle of the magnetic stylus when generating the signature.

29. The method of claim 23, the acts further comprising:

performing an analysis of vector data generated by the magnetic stylus, the vector data including:

a motion of the magnetic stylus, an orientation of the magnetic stylus, an amount of pressure exerted using the magnetic stylus, and a position of the magnetic stylus; and providing feedback to the writing lesson based on the analysis.

30. The one or more non-transitory computer-readable storage media of claim 17, wherein the writing lesson includes static content that a user annotates to make use of the static content.

* * * * *

UNITED STATES PATENT AND TRADEMARK OFFICE
CERTIFICATE OF CORRECTION

PATENT NO. : 9,285,903 B1
APPLICATION NO. : 13/247726
DATED : March 15, 2016
INVENTOR(S) : Tiffany Ann Yun et al.

Page 1 of 1

It is certified that error appears in the above-identified patent and that said Letters Patent is hereby corrected as shown below:

In the claims;

Column 15, line 14, claim 1 change "performing" to -- perform --.

Signed and Sealed this
Third Day of May, 2016

Michelle K. Lee
*Director of the United States Patent and Trademark Office*